United States Patent
Snis

(10) Patent No.: US 12,151,286 B2
(45) Date of Patent: Nov. 26, 2024

(54) DEVICES, SYSTEMS, AND METHODS FOR CALIBRATING AND OPERATING AN ADDITIVE MANUFACTURING SYSTEM HAVING A PLURALITY OF ELECTRON BEAM GUNS

(71) Applicant: ARCAM AB, Mölnlycke (SE)

(72) Inventor: Anders Snis, Uddevalla (SE)

(73) Assignee: Arcam AB, Mölnlycke (SE)

( * ) Notice: Subject to any disclaimer, the term of this patent is extended or adjusted under 35 U.S.C. 154(b) by 401 days.

(21) Appl. No.: 17/349,997

(22) Filed: Jun. 17, 2021

(65) Prior Publication Data

US 2022/0402035 A1    Dec. 22, 2022

(51) Int. Cl.
| | | |
|---|---|---|
| B22F 10/31 | (2021.01) | |
| B22F 10/85 | (2021.01) | |
| B22F 12/30 | (2021.01) | |
| B22F 12/41 | (2021.01) | |
| B22F 12/45 | (2021.01) | |
| B22F 12/90 | (2021.01) | |
| B33Y 30/00 | (2015.01) | |
| B33Y 50/02 | (2015.01) | |

(52) U.S. Cl.
CPC ............. *B22F 10/31* (2021.01); *B22F 10/85* (2021.01); *B22F 12/30* (2021.01); *B22F 12/41* (2021.01); *B22F 12/45* (2021.01); *B22F 12/90* (2021.01); *B33Y 50/02* (2014.12); *B33Y 30/00* (2014.12)

(58) Field of Classification Search
CPC ....................................................... B22F 10/31
USPC ........................................................ 700/118
See application file for complete search history.

(56) References Cited

U.S. PATENT DOCUMENTS

| | | |
|---|---|---|
| 4,442,361 A | 4/1984 | Zasio et al. |
| 5,155,359 A | 10/1992 | Monahan |
| 5,424,548 A | 6/1995 | Puisto |
| 5,798,528 A | 8/1998 | Butsch et al. |
| 7,075,093 B2 | 7/2006 | Gorski et al. |
| 8,198,797 B2 | 6/2012 | Iijima et al. |
| 2011/0006678 A1* | 1/2011 | Ferguson ................ H01J 25/14 |
| | | 315/5.35 |
| 2015/0004045 A1* | 1/2015 | Ljungblad ............... B22F 12/45 |
| | | 425/78 |
| 2017/0087661 A1* | 3/2017 | Backlund ........... B23K 15/0013 |
| 2022/0395904 A1* | 12/2022 | Lock ................... B23K 15/0013 |

(Continued)

FOREIGN PATENT DOCUMENTS

WO    WO-2018177531 A1 *    10/2018    .............. B22F 10/20

*Primary Examiner* — Mohammad Ali
*Assistant Examiner* — Joshua T Sanders
(74) *Attorney, Agent, or Firm* — Dinsmore & Shohl LLP

(57) ABSTRACT

Devices, systems and methods for calibrating and operating an additive manufacturing system are disclosed. A calibration system for an electron beam additive manufacturing system having a plurality of electron beam guns includes a calibration probe positioned in a build chamber of the electron beam additive manufacturing system, a sensing device positioned to measure and acquire a response generated as a result of impingement of electron beams emitted from the plurality of electron beam guns on the calibration probe, the sensing device generating a response signal as a result of the measured and acquired response, and an analysis component communicatively coupled to the sensing device and programmed to analyze and evaluate the response signal.

20 Claims, 14 Drawing Sheets

(56) References Cited

U.S. PATENT DOCUMENTS

2022/0402036 A1* 12/2022 Snis ................. B22F 12/41
2023/0154722 A1* 5/2023 Bleeker ............ H01J 37/04
                                                                                 250/310

* cited by examiner

DEVICES, SYSTEMS, AND METHODS FOR CALIBRATING AND OPERATING AN ADDITIVE MANUFACTURING SYSTEM HAVING A PLURALITY OF ELECTRON BEAM GUNS

FIELD

The present disclosure relates to devices, systems, and methods for employing a plurality of electron beam guns in an additive manufacturing system, and more specifically, for calibrating the plurality of electron beam guns and/or coordinating movement and/or precision of each of the plurality of electron beam guns.

BACKGROUND

In additive manufacturing processes, particularly those that utilize a plurality of electron beam guns to melt a powder layer to create an article, it may be necessary to ensure that the electron beam guns operate in a manner that avoids and/or minimizes interaction. Shielding of the electron beam guns and/or components thereof may not always be feasible or desirable.

SUMMARY

In a first aspect, a calibration system for an electron beam additive manufacturing system having a plurality of electron beam guns includes a calibration probe positioned in a build chamber of the electron beam additive manufacturing system. The calibration system further includes a sensing device positioned to measure and acquire a response generated as a result of impingement of electron beams emitted from the plurality of electron beam guns on the calibration probe. The sensing device generates a response signal as a result of the measured and acquired response. The calibration system further includes an analysis component communicatively coupled to the sensing device and programmed to analyze and evaluate the response signal.

In a second aspect, an electron beam additive manufacturing system includes a build chamber, a plurality of electron beam guns, each one of the plurality of electron beam guns emitting a corresponding electron beam within the build chamber, a calibration system that calibrates each one of the plurality of electron beam guns, and an analysis component. The calibration system includes a calibration probe positioned in the build chamber, a sensing device positioned to measure and acquire a response generated as a result of impingement of electron beams emitted from the plurality of electron beam guns on the calibration probe, the sensing device generating a response signal as a result of the measured and acquired response, and an oscilloscope communicatively coupled to the analysis component and electrically coupled to the calibration probe such that electrical signals generated as a result of electron beam impingement on the calibration probe are detected by the oscilloscope. The analysis component is communicatively coupled to the oscilloscope and the sensing device.

In a third aspect, a method of calibrating a plurality of electron beam guns in a build chamber includes directing a first electron beam gun of the plurality of electron beam guns to execute a first scan function. The first scan function causes a first electron beam emitted from the first electron beam gun to impinge on a plurality of portions of a first patterned site located on a first portion of a calibration probe in the build chamber. The method further includes providing one or more predetermined coil values to a second electron beam gun of the plurality of electron beam guns. The predetermined coil values, when executed, causes the second electron beam gun to emit a second electron beam that impinges along a predetermined path on a second portion of the calibration probe. The method further includes receiving one or more first signals from the calibration probe, the one or more first signals indicative of a response generated as a result of impingement the first electron beam on the plurality of portions of the first patterned site. The method further includes synchronizing in time the one or more first signals with coil values of the first electron beam gun and the predetermined coil values of the second electron beam gun.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

The present disclosure generally relates to devices, systems, and methods that allow for use of a plurality of electron beam guns to form metallic articles. The plurality of electron beam guns should be particularly arranged and configured to avoid an issue where interaction occurs between the coils that alter the electron beams respectively emitted therefrom, particularly when shielding is impractical, unavailable, not possible, not feasible, and/or not desirable. This interaction can be avoided or minimized by calibrating the electron beam guns with respect to one another, by coordinating the movement of the electron beam guns, and/or controlling a sequence of movement and/or precision (e.g., low precision mode, high precision mode) of each of the electron beam guns relative to other electron beam guns, as described in greater detail herein.

Shielding, which generally includes placing a shroud of material around one or more components of an electron beam gun (e.g., around one or more coils of an electron beam gun), can sometimes be effective in preventing magnetic interference in instances where a plurality of electron beam guns is used adjacent to one another. However, shielding is not always completely effective and interaction may still occur. Further, shielding may undesirably cause induction in some systems, which may slow down movement of electron beams emitted by the electron beam guns.

Figure 1A:
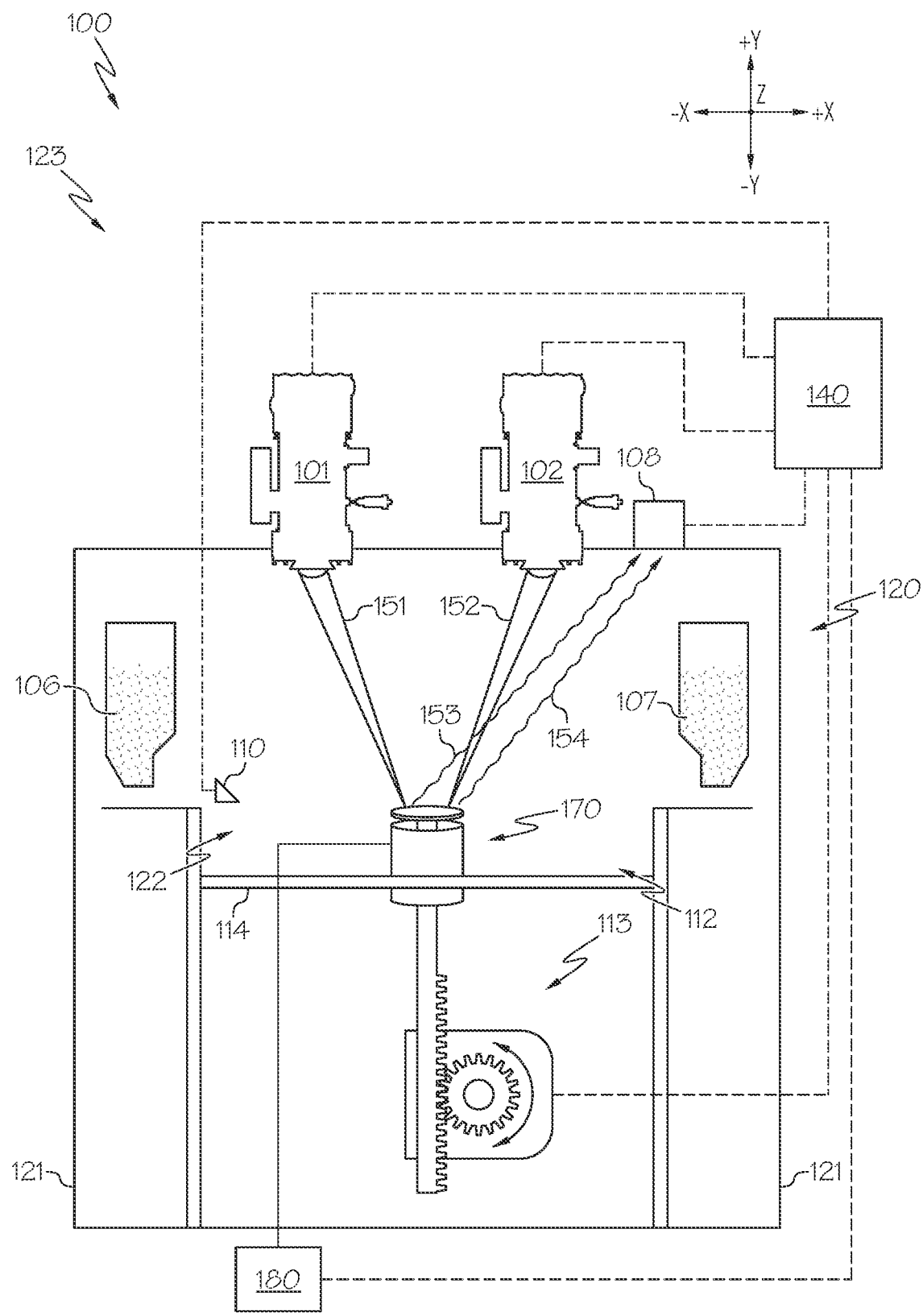
FIG. 1A schematically depicts a cutaway side view of an illustrative additive manufacturing system including a plurality of electron beam emitters and a calibration probe according to one or more embodiments shown and described herein.

One such particularly configured additive manufacturing system that includes a plurality of electron beam emitters and a calibration probe is depicted in FIG. 1A, whereby each one of the plurality of electron beam emitters is calibrated, a movement sequence is coordinated, and/or a sequence of precision is coordinated. As such, when the probe is removed as depicted in FIG. 1B, the devices, systems, and methods described herein can result in quicker and more accurate formation of an article using electron beam melting without issues that were traditionally caused by the use of a plurality of electron beam emitters (e.g., interaction, use of shielding, and/or the like).

Electron-beam additive manufacturing, which may also be known as electron-beam melting (EBM), is a type of additive manufacturing (e.g., 3D printing) process that is typically used for metallic articles. EBM utilizes a raw material in the form of a metal powder or a metal wire, which is placed under a vacuum (e.g., within a vacuum sealed build chamber). Generally speaking, the raw material is fused together from heating via an electron beam.

The systems described herein that utilize EBM generally obtain data from a 3D computer-aided design (CAD) model and use the data to place successive layers of the raw material using an apparatus to spread the raw material, such as a powder distributor. The successive layers are melted together utilizing a plurality of electronically-controlled electron beams. As noted above, the process takes place under vacuum within a vacuum sealed build chamber, which makes the process suited to manufacture parts using reactive materials having a high affinity for oxygen (e.g., titanium). In embodiments, the process operates at higher temperatures (up to about 1000° C.) relative to other additive manufacturing processes, which can lead to differences in phase formation through solidification and solid-state phase transformation.

Figure 1B:
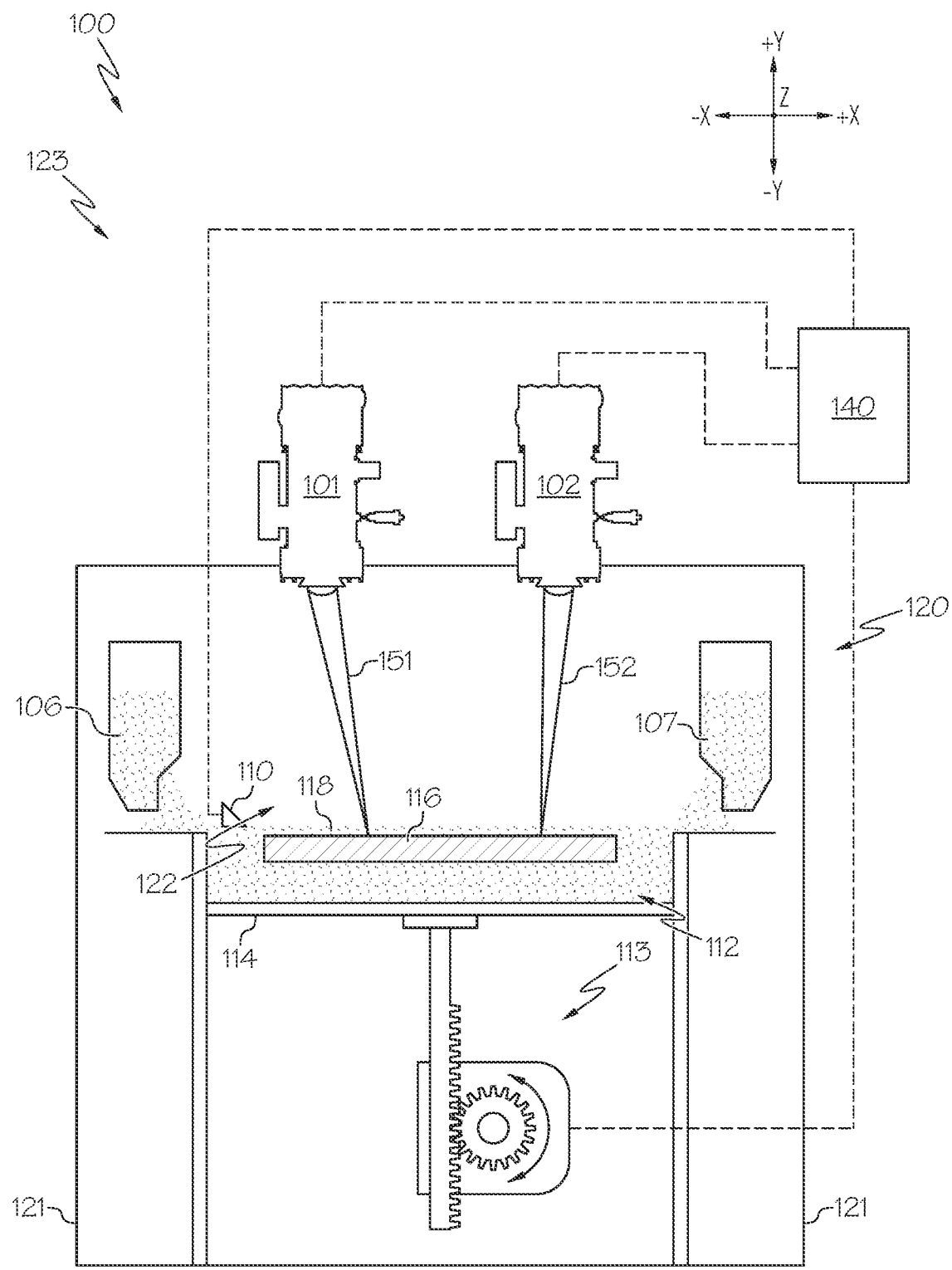
FIG. 1B schematically depicts a cutaway side view of the illustrative additive manufacturing system of FIG. 1A after a calibration process according to one or more embodiments shown and described herein.

FIGS. 1A and 1B depict embodiments of the present disclosure with a calibration probe 170, an oscilloscope 180, and a sensing device 108 inserted as shown in FIG. 1A for the purposes of calibration and removed as shown in FIG. 1B for the purposes of EBM after calibration. As shown in FIGS. 1A-1B, an additive manufacturing system 100 includes at least a build chamber 120, a plurality of electron beam (EB) guns (e.g., a first EB gun 101 and a second EB gun 102), and an analysis component 140. As shown in FIG. 1A, the build chamber 120 also includes a calibration probe 170, an oscilloscope 180, and a sensing device 108 in embodiments where the first EB gun 101 and the second EB gun 102 are calibrated, as described in greater detail herein. The calibration probe 170, the oscilloscope 180, and the sensing device 108 may be removed from the build chamber 120 during EBM once calibration has been completed, as depicted in FIG. 1B.

Referring to both FIGS. 1A and 1B, the build chamber 120 defines an interior 122 that is separated from an exterior environment 123 via one or more chamber walls 121. In some embodiments, due to the harsh environment within the build chamber 120, the sensing device 108 is generally located adjacent to the build chamber 120 in the exterior environment 123 (i.e., not located within the interior 122 of the build chamber 120), and is arranged to detect various properties of electron beams within the interior 122 of the build chamber 120, as well as movement and/or locations of the beams relative to one another and/or various components of the build chamber 120. However, it should be understood that the location of the sensing device 108 outside the build chamber 120 is not limited by this disclosure. That is, in other embodiments, the sensing device 108 may be located in the interior 122 of the build chamber 120.

In some embodiments, the interior 122 of the build chamber 120 may be a vacuum sealed interior such that an article 116 (FIG. 1B) formed within the build chamber 120 is formed under optimal conditions for EBM, as is generally understood. Still referring to FIGS. 1A-1B, the build chamber 120 is capable of maintaining a vacuum environment via a vacuum system. Illustrative vacuum systems may include, but are not limited to, a turbo molecular pump, a scroll pump, an ion pump, and one or more valves, as are generally understood. In some embodiments, the vacuum system may be communicatively coupled to the analysis component 140 such that the analysis component 140 directs operation of the vacuum system to maintain the vacuum within the interior 122 of the build chamber 120. In some embodiments, the vacuum system may maintain a base pressure of about $1\times10^{-5}$ mbar or less throughout an entire build cycle. In further embodiments, the vacuum system may provide a partial pressure of He to about $2\times10^{-3}$ mbar during a melting process.

In other embodiments, the build chamber 120 may be provided in an enclosable chamber provided with ambient air and atmosphere pressure. In yet other embodiments, the build chamber 120 may be provided in open air.

The build chamber 120 generally includes within the interior 122 a build envelope 112 supporting the calibration probe 170 (FIG. 1A) thereon during calibration and a powder layer 118 (FIG. 1B) thereon after calibration, as well as a powder distributor 110. Still referring to FIGS. 1A-1B, in some embodiments, the build chamber 120 may further include one or more raw material hoppers 106, 107 that maintain raw material therein. The build chamber 120 may further include other components, particularly components that facilitate EBM, including components not specifically described herein.

The build envelope 112 is generally a platform or receptacle located within the interior 122 of the build chamber 120 that is arranged to receive the raw material from the one or more raw material hoppers 106, 107 and/or support the calibration probe 170 (FIG. 1A) thereon. The build envelope 112 is not limited in size or configuration by the present disclosure, but may generally be shaped and sized to hold the calibration probe 170 (FIG. 1A) and/or an amount of the raw material from the raw material hoppers 106, 107 in the form of the powder layer 118, one or more portions of article 116, and/or unfused raw material (FIG. 1B), as described in greater detail herein.

Still referring to FIGS. 1A-1B, in some embodiments, the build envelope 112 may include a movable build platform 114 supported by a lifting component 113. The movable build platform 114 may generally be a surface within the build envelope 112 that is movable by the lifting component 113 in a system vertical direction (e.g., in the +y/−y directions of the coordinate axes of FIGS. 1A-1B) to increase and/or decrease a total volume of the build envelope 112. For example, the movable build platform 114 within the build envelope 112 may be movable by the lifting component 113 in a downward direction (e.g., toward the −y direction of the coordinate axes of FIGS. 1A-1B) so as to increase the volume of the build envelope 112. Referring specifically to FIG. 1B, the movable build platform 114 may be movable (e.g., capable of being lowered) by the lifting component 113 to add each successive powder layer 118 to the article 116 being formed, as described in greater detail herein.

Referring again to FIGS. 1A-1B, the lifting component 113 is not limited by the present disclosure, and may generally be any device or system capable of being coupled to the movable build platform 114 and movable to raise or lower the movable build platform 114 in the system vertical direction (e.g., in the +z/−z directions of the coordinate axes of FIGS. 1A-1B). In some embodiments, the lifting component 113 may utilize a linear actuator type mechanism to effect movement of the movable build platform 114. Illustrative examples of devices or systems suitable for use as the lifting component 113 include, but are not limited to, a scissor lift, a mechanical linear actuator such as a screw based actuator, a wheel and axle actuator (e.g., a rack and pinion type actuator), a hydraulic actuator, a pneumatic actuator, a piezoelectric actuator, an electromechanical actuator, and/or the like. In some embodiments, the lifting component 113 may be located within the build chamber 120. In other embodiments, the lifting component 113 may be only partially located within the build chamber 120, particularly in embodiments where it may be desirable to isolate portions of the lifting component 113 that are sensitive to the harsh conditions (e.g., high heat, excessive dust, etc.) within the interior 122 of the build chamber 120.

Referring to FIG. 1B, the powder distributor 110 is generally arranged and configured to lay down and/or spread a layer of the raw material as the powder layer 118 in the build envelope 112 (e.g., on start plate or the build platform 114 within the build envelope 112). That is, the powder distributor 110 is arranged such that movement of the powder distributor 110 is in a horizontal plane defined by the x-axis and the y-axis of the coordinate axes depicted in FIG. 1B. For example, the powder distributor 110 may be an arm, rod, or the like that extends a distance in the y direction of the coordinate axes of FIG. 1B over or above the build envelope 112 (e.g., from a first end to a second end of the build envelope 112). In some embodiments, the length of the powder distributor 110 may be longer than a width of the build platform 114 such that the powder layer 118 can be distributed on each position of the build platform 114. In some embodiments, the powder distributor 110 may have a central axis in parallel with a top surface of the build platform 114 (e.g., generally parallel to the +x/−x axis of the coordinate axes of FIG. 1B). One or more motors, actuators, and/or the like may be coupled to the powder distributor 110 to effect movement of the powder distributor 110. For example, a rack and pinion actuator may be coupled to the powder distributor 110 to cause the powder distributor 110 to move back and forth over the build envelope in the +x/−x directions of the coordinate axes of FIG. 1B. In some embodiments, movement of the powder distributor 110 may be continuous (e.g., moving without stopping, other than to change direction). In other embodiments, movement of the powder distributor 110 may be stepwise (e.g., moving in a series of intervals, while stopping in between intervals for a period of time). In yet other embodiments, movement of the powder distributor 110 may be such that a plurality of interruptions occur between periods of movement.

The powder distributor 110 may further include one or more teeth (e.g., rake fingers or the like) that extend from the powder distributor 110 into the raw material from the raw material hoppers 106, 107 to cause disruption of the raw material when the powder distributor 110 moves (e.g., to distribute the raw material, to spread the powder layer 118, etc.). For example, the powder distributor 110 may include a plurality of rake teeth extending from a bottom surface of the powder distributor 110 (e.g., extending generally towards the −z direction of the coordinate axes of FIG. 1B). In some embodiments, the rake teeth may extend in a direction that is substantially perpendicular to a plane of the build platform 114 (e.g., perpendicular to the plane formed by the x-axis and y-axis of the coordinate axes depicted in FIG. 1B). In another embodiment, the rake teeth may be slanted with respect to the build platform 114. An angle of the slanted rake teeth with respect to a normal to the build platform may be any value, and in some embodiments is between about 0° and about 45°. In some embodiments, each one of the plurality of rake teeth may be a metal foil or a metal sheet. The total length of the plurality of rake teeth may be longer than a width of the build platform 114 in order to make it possible to distribute powder on each position of the build platform 114. The rake teeth may also be shaped and sized to rake through the raw material to distribute the powder layer 118 on the build platform 114.

It should be understood that while the powder distributor 110 described herein generally extends a distance in the x direction of the coordinate axes depicted in FIG. 1B and moves in the +x/−x directions of the coordinate axes depicted in FIG. 1B to spread the powder layer 118 as described above, this is merely one illustrative example. Other configurations are also contemplated. For example, the powder distributor 110 may rotate about an axis to spread the powder layer 118, may articulate about one or more joints or the like to spread the powder layer 118, and/or the like without departing from the scope of the present disclosure.

In some embodiments, a cross section of the powder distributor 110 may be generally triangular, as depicted in FIG. 1B. However, it should be understood that the cross section may be any shape, including but not limited to, circular, elliptical, quadratic, rectangular, polygonal or the like. A height of the powder distributor 110 may be set in order to give the powder distributor 110 a particular mechanical strength in the system vertical direction (e.g., along the +z/−z axis of the coordinate axes of FIG. 1B). That is, in some embodiments, the powder distributor 110 may have a particular controllable flex in the system vertical direction. The height of the powder distributor may also be selected taking into account that the powder distributor 110 pushes an amount of the raw material. If the height of the powder distributor 110 is too small, the powder distributor 110 can only push forward a smaller amount relative to a higher power powder distributor 110. However, if the height of the powder distributor 110 is too high, the powder distributor 110 may complicate the powder catching from a scree of powder, (e.g., the higher the height of the powder distributor 110, the more force may be required in order to catch a predetermined amount of powder from the scree of powder by moving the powder distributor 110 into the scree of powder and letting a predetermined amount of powder fall over the top of the powder distributor 110 from a first side in the direction of travel into the scree of powder to a second side in the direction of the build platform 114).

In some embodiments, the powder distributor 110 may be communicatively coupled to the analysis component 140, as depicted by the dashed line in FIGS. 1A-1B between the powder distributor 110 and the analysis component 140. As used herein, the term "communicatively coupled" generally refers to any link in a manner that facilitates communications. As such, "communicatively coupled" includes both wireless and wired communications, including those wireless and wired communications now known or later developed. As the powder distributor 110 is communicatively coupled to the analysis component 140, the analysis component 140 may transmit one or more signals, data, and/or the like to cause the powder distributor 110 to move, change direction, change speed, and/or the like. For example, a "reverse direction" signal transmitted by the analysis component 140 to the powder distributor 110 may cause the powder distributor 110 to reverse the direction in which it is moving (e.g., reverse movement in the +x direction of the coordinate axes of FIGS. 1A-1B to movement in the −x direction of the coordinate axes of FIGS. 1A-1B).

Each of the raw material hoppers 106, 107 may generally be containers that hold an amount of the raw material therein and contain an opening to dispense the raw material therefrom. While FIGS. 1A-1B depict two raw material hoppers 106, 107, the present disclosure is not limited to such. That is, any number of raw material hoppers may be utilized without departing from the scope of the present disclosure. Further, while FIGS. 1A-1B depict the raw material hoppers 106, 107 as being located within the interior 122 of the build chamber 120, the present disclosure is not limited to such. That is, the raw material hoppers 106, 107 may be located outside or partially outside the build chamber 120 in various other embodiments. However, it should be understood that if a raw material hopper is located outside or partially outside the build chamber 120, one or more outlets of the raw material hoppers that supply the raw material may be selectively sealed when not distributing the raw material in order to maintain the vacuum within the build chamber 120.

The shape and size of the raw material hoppers 106, 107 are not limited by the present disclosure. That is, the raw material hoppers 106, 107 may generally have any shape and or size without departing from the scope of the present disclosure. In some embodiments, each of the raw material hoppers 106, 107 may be shaped and or sized to conform to the dimensions of the build chamber 120 such that the raw material hoppers 106, 107 can fit inside the build chamber 120. In some embodiments, the raw material hoppers 106, 107 may be shaped and sized such that a collective volume of the raw material hoppers 106, 107 is sufficient to hold an amount of raw material that is necessary to fabricate the article 116 (FIG. 1B), which includes a sufficient amount of material to form each successive powder layer 118 (FIG. 1B) and additional material that makes up the unfused raw material.

Referring to FIG. 1B, the raw material hoppers 106, 107 may generally have an outlet for ejecting the raw material located within the raw material hoppers 106, 107 such that the raw material can be spread by the powder distributor 110, as described herein. In some embodiments, such as the embodiment depicted in FIG. 1B, the raw material may freely flow out of the raw material hoppers 106, 107 under the force of gravity, thereby forming piles or scree of raw material for the powder distributor 110 to spread. In other embodiments, the outlets of the raw material hoppers 106, 107 may be selectively closed via a selective closing mechanism so as to only distribute a portion of the raw material located within the respective raw material hoppers 106, 107 at a particular time. The selective closing mechanisms may be communicatively coupled to the analysis component 140 such that data and/or signals transmitted to/from the analysis component 140 can be used to selectively open and close the outlets of the raw material hoppers 106, 107.

The raw material contained within the raw material hoppers 106, 107 and used to form the article 116 is not limited by the present disclosure, and may generally be any raw material used for EBM now known or later developed. Illustrative examples of raw material includes, but is not limited to, pure metals such as titanium, aluminum, tungsten, or the like; and metal alloys such as titanium alloys, aluminum alloys, stainless steel, cobalt-chrome alloys, cobalt-chrome-tungsten alloys, nickel alloys, and/or the like. Specific examples of raw material include, but are not limited to, $Ti_6Al_4V$ titanium alloy, $Ti_6Al_4V$ ELI titanium alloy, Grade 2 titanium, and ASTM F75 cobalt-chrome (all available from Arcam AB, Mölndal, Sweden). Another specific example of raw material is INCONEL® alloy 718 available from Special Metals Corporation (Huntington W. Va.).

In embodiments, the raw material is pre-alloyed, as opposed to a mixture. This may allow classification of EBM with selective laser melting (SLM), where other technologies like selective laser sintering (SLS) and direct metal laser sintering (DMLS) require thermal treatment after fabrication. Compared to selective laser melting (SLM) and DMLS, EBM has a generally superior build rate because of its higher energy density and scanning method.

Referring again to FIGS. 1A-1B, the EB guns 101, 102 are each generally a device that emits an electron beam (e.g., a charged particle beam), such as, for example, an electron gun, a linear accelerator, or the like. The EB guns 101, 102 each, respectively, generate a beam 151, 152 that may be used for melting or fusing together the raw material when spread as the powder layer 118 on the build platform 114.

Figure 2B:
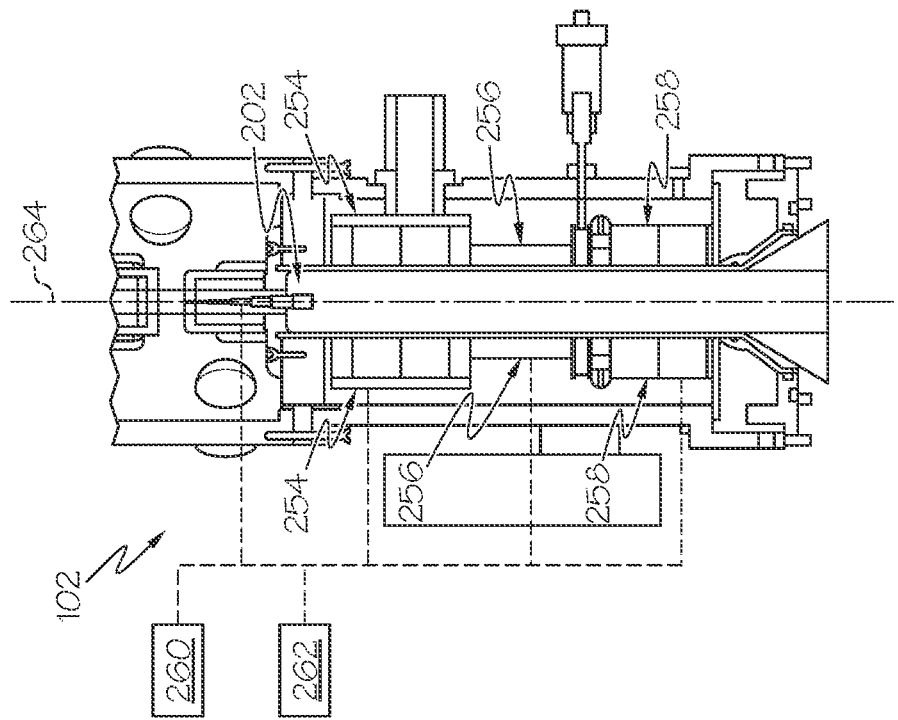
FIG. 2B schematically depicts a cutaway side view of an illustrative second electron beam emitter according to one or more embodiments shown and described herein.
Figure 2A:
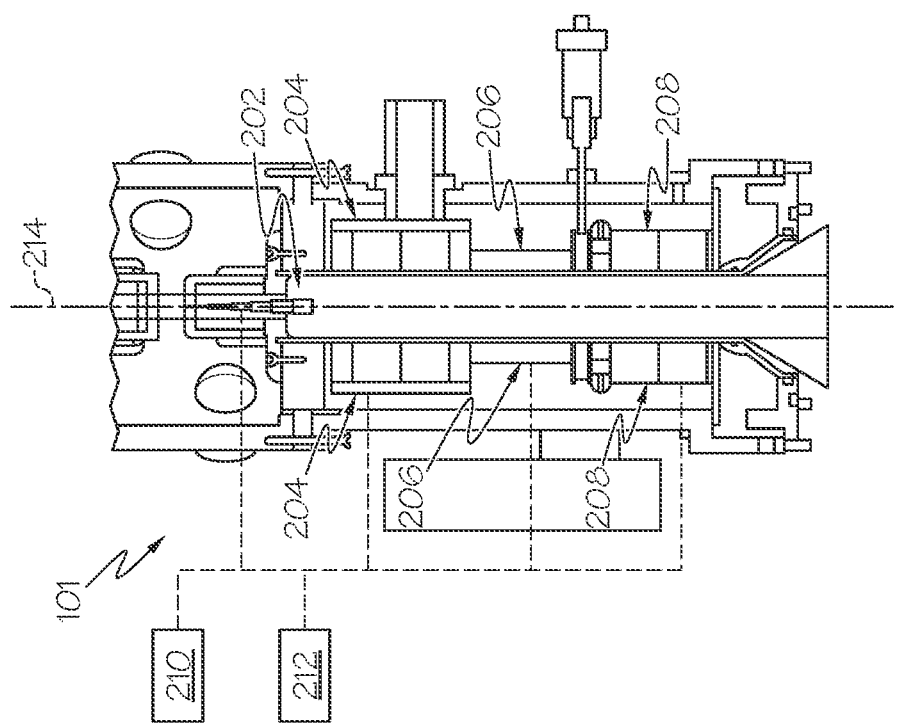
FIG. 2A schematically depicts a cutaway side view of an illustrative first electron beam emitter according to one or more embodiments shown and described herein.

Referring to FIGS. 1A-1B and 2A, in some embodiments, the first EB gun 101 includes an electron emitter 202, at least one focusing coil 206, and at least one deflection coil 208. In some embodiments, the first EB gun 101 may further include at least one astigmatism coil 204 (e.g., a stigmator). In still other embodiments, the first EB gun 101 may include a power supply 210, which may be electrically connected to at least one gun control unit 212, the electron emitter 202, the at least one astigmatism coil 204, the at least one focusing coil 206, and/or the at least one deflection coil 208. In some embodiments, the various components of the first EB gun 101 are arranged such that the at least one astigmatism coil 204, the at least one focusing coil 206, and the at least one deflection coil 208 are positioned relative to the electron emitter 202 such that electrons emitted by the electron emitter 202 are passed through a void defined by each of the coils 204, 206, 208. In the embodiment depicted in FIG. 2A, the at least one astigmatism coil 204 may be positioned closest to the electron emitter 202 relative to the focusing coil 206 and the deflecting coil 208, the focusing coil 206 may be positioned closer to the electron emitter 202 relative to the deflecting coil 208, and the deflecting coil 208 may be positioned farthest away from the electron emitter 202. However, this is merely illustrative, and other positions of the various coils relative to the electron emitter 202 are contemplated and included within the scope of the present disclosure.

The electron emitter 202 is generally an electron beam emitting component containing a filament/cathode and/or an anode electrically coupled to the power supply 210 via the gun control unit 212. The electron emitter 202 emits electrons into free space generally in a direction towards a space defined in the center of the coils 204, 206, 208 as a result of application of an electric current generated by the power supply 210. That is, the electrons emitted by the electron emitter 202 are generally directed in the direction indicated by dashed line 214 in FIG. 2A. In some embodiments, to ensure a directed emission of electrons therefrom, the electron emitter 202 may be formed into a particular shape that is adapted for such an electron emission. For example, the electron emitter 202 may be formed in a loop, as a tip having a particular radius of curvature, as one or more legs spaced apart from one another, and/or the like. The electron emitter 202 may be constructed of a particular material for emitting electrons, such as, for example, tungsten (W), lanthanum hexaboride ($LaB_6$), or the like. In some embodiments, the electron emitter 202 may be formed as the result of an etching process. An illustrative electron emitter may be provided by Energy Beam Sciences, Inc. (East Granby, CT). In one illustrative embodiment, the electron emitter 202 may produce a focusable electron beam with an accelerating voltage of about 60 kilovolts (kV) and with a beam power in the range of about 0 kilowatts (kW) to about 10 kW. It should be understood that the various features of the electron emitter 202 are merely illustrative, and that other features are also contemplated.

The at least one focusing coil 206 is generally a coil of electrically conductive material that has a plurality of turns/windings and is electrically coupled to a power source (e.g., the power supply 210). The at least one focusing coil 206 is positioned relative to the electron emitter 202 such that electrons emitted by the electron emitter are passed through a center of the at least one focusing coil 206 (e.g., a void defined by the plurality of turns/windings of the at least one focusing coil 206). That is, the at least one focusing coil 206 is oriented transverse to an axis defined by the dashed line 214 depicted in FIG. 2A. The arrangement and location of the at least one focusing coil 206 relative to the electron emitter 202 and/or the shape and size of the plurality of turns/windings may be such that, when an electrical current is applied across the at least one focusing coil 206, a magnetic field is generated in the void defined by the turns/windings. The magnetic field acts as a lens for the electrons emitted by the electron emitter 202, converging the electrons into an electron beam having a single focal point. As such, modification of the electrical current applied across the at least one focusing coil 206 alters the magnetic field, which in turn alters the focal point of the electron beam.

The at least one deflection coil 208 is generally a coil of electrically conductive material that has a plurality of turns/windings and is electrically coupled to a power source (e.g., the power supply 210). The at least one deflection coil 208 is positioned relative to the electron emitter 202 and/or the at least one focusing coil 206 such that electrons emitted by the electron emitter 202 and focused into a beam by the at least one focusing coil 206 are passed through a center of the at least one deflection coil 208 (e.g., a void defined by the plurality of turns/windings of the at least one deflection coil 208). That is, the at least one deflection coil 208 is oriented transverse to an axis defined by the dashed line 214 depicted in FIG. 2A. The arrangement and location of the at least one deflection coil 208 relative to the electron emitter 202 and/or the at least one focusing coil 206 and/or the shape and size of the plurality of turns/windings may be such that, when an electrical current is applied across the at least one deflection coil 208, a magnetic field and/or an electrical field is generated in the void defined by the turns/windings. The magnetic field and/or electrical field acts to direct the electron beam emitted by the electron emitter 202 and focused by the at least one focusing coil 206, causing the electron beam to be directed to a particular location based on the characteristics of the magnetic field and/or electrical field. As such, modification of the electrical current applied across the at least one deflection coil 208 alters the magnetic field and/or electrical field, which in turn alters the path of travel of the electron beam.

The at least one astigmatism coil 204 is generally a coil of electrically conductive material that has a plurality of turns/windings and is electrically coupled to a power source (e.g., the power supply 210). The at least one astigmatism coil 204 is positioned relative to the electron emitter 202 such that electrons emitted by the electron emitter 202 are passed through a center of the at least one astigmatism coil 204 (e.g., a void defined by the plurality of turns/windings of the at least one astigmatism coil 204). That is, the at least one astigmatism coil 204 is oriented transverse to an axis defined by the dashed line 214 depicted in FIG. 2A. The arrangement and location of the at least one astigmatism coil 204 relative to the electron emitter 202 and/or the shape and size of the plurality of turns/windings may be such that, when an electrical current is applied across the at least one astigmatism coil 204, a magnetic field is generated in the void defined by the turns/windings. The magnetic field acts to correct any focus defects present in the electrons emitted by the electron emitter 202, causing the electrons to converge in a beam that is radially uniform. As such, modification of the electrical current applied across the at least one astigmatism coil 204 alters the magnetic field, which in turn alters the electron beam distortion.

The various coils depicted in FIG. 2A (e.g., the at least one astigmatism coil 204, the at least one focusing coil 206, and the at least one deflection coil 208) are generally unshielded. That is, an iron shroud or similar shielding device, which is typical for coils in other EB guns, may not be present around one or more of the coils of the first EB gun 101 in some embodiments. The omission of the shielding around the various coils depicted in FIG. 2A allows for the EB gun 101 to be optimized for speed rather than sensitivity. This is because shielding typically introduces more inductance, but makes focus response slow (e.g., when the shielding is present around the focusing coil 206). The lack of sensitivity optimization due to shielding is offset by the calibration process described herein. In some embodiments, one or more of the various coils may be surrounded by a reflector coil that is fed with the same current fed to the various coils, but in an opposite direction, such that the magnetic fields outside the various coils is canceled out.

While the embodiment of FIG. 2A only depicts three coils (e.g., the at least one astigmatism coil 204, the at least one focusing coil 206, and the at least one deflection coil 208), it should be understood that this is merely illustrative. Fewer or additional coils may be included within the EB gun 101 without departing from the scope of the present disclosure. In one particular embodiment, the EB gun 101 may include six coils therein, where at least one of the six coils is a focusing coil and at least one of the six coils is a deflection coil.

The power supply 210 is generally any component that provides electrical power to the components of the first EB gun 101 (e.g., the electron emitter 202, the at least one astigmatism coil 204, the at least one focusing coil 206, and/or the at least one deflection coil 208). The power supply 210 may have a plurality of power outputs, each of the plurality of power outputs coupled to one of the components of the first EB gun 101. As such, the power supply 210 can modulate the electricity provided to each of the component of the first EB gun 101 independently of one another. That is, a first voltage, frequency, and/or the like can be provided to a first component of the first EB gun 101 and a second voltage, frequency, and/or the like can be provided to a second component of the first EB gun 101. Control of the electricity provided to the various components of the first EB gun 101 may be achieved by the gun control unit 212, which is electrically coupled to the power supply 210 and/or each of the components of the first EB gun 101 (e.g., the electron emitter 202, the at least one astigmatism coil 204, the at least one focusing coil 206, and/or the at least one deflection coil 208). That is, the gun control unit 212 controls the electricity provided to each of the components of the first EB gun 101 to ensure that a particular voltage, a particular frequency, and/or the like is supplied to each component of the first EB gun 101 to ensure a particular control of the characteristics of the electron beam emitted by the first EB gun 101.

In some embodiments, the power supply 210 is a Tesla transformer, as it produces multi-megavolt pulses of very high power (e.g., on the order of tens of megawatts). In embodiments, the pulse repetition rate may be about twice the frequency of the supply mains, and may be limited only by a deionization time of a single spark-gap switch. When a high-voltage pulse is applied by the power supply 210, driving a cathode of the electron emitter 202 to a large negative potential, the electric field at the cathode face becomes so great that emission of electrons occurs. The electrons may be released normal to the face of the cathode and are accelerated through an evacuated region of a gun barrel of the first EB gun 101 by the electric field of the cathode through the magnetic fields and/or electrical fields produced by the various coils 204, 206, 208.

While only a single power supply 210 is depicted in FIG. 2A, it should be understood that a plurality of power supplies may also be used without departing from the scope of the present disclosure. That is, the first EB gun 101 may have a dedicated power supply for each of the components thereof in some embodiments. For example, the electron emitter 202 may have a first power supply and the various coils 204, 206, 208 may have a second power supply coupled thereto. In another example, the electron emitter 202 may have a first power supply coupled thereto, the at least one astigmatism coil 204 may have a second power supply coupled thereto, the at least one focusing coil 206 may have a third power supply coupled thereto, and the at least one deflection coil 208 may have a fourth power supply coupled thereto.

It should be understood that the first EB gun 101 may include other components that are not specifically recited herein. In a nonlimiting example, the first EB gun 101 may further include one or more focusing lens, one or more astigmatic lenses, one or more deflection lenses, one or more pumps (e.g., turbo pumps), one or more gate valves, one or more apertures, and/or the like. In some embodiments, the first EB gun 101 may include a plurality of columns (e.g., an upper column arranged above a lower column). Such columns may include a pressure differential therebetween (e.g., a pressure differential of about $10^{-4}$ mbar).

Referring to FIGS. 1A-1B and 2B, in some embodiments, the second EB gun 102 includes an electron emitter 252, at least one focusing coil 256, and at least one deflection coil 258. In some embodiments, the second EB gun 102 may further include at least one astigmatism coil 254 (e.g., a stigmator). In still other embodiments, the second EB gun 102 may include a power supply 260, which may be electrically connected to at least one gun control unit 262, the electron emitter 252, the at least one astigmatism coil 254, the at least one focusing coil 256, and/or the at least one deflection coil 258. In some embodiments, the various components of the second EB gun 102 are arranged such that the at least one astigmatism coil 254, the at least one focusing coil 256, and the at least one deflection coil 258 are positioned relative to the electron emitter 252 such that electrons emitted by the electron emitter 252 are passed through a void defined by each of the coils 254, 256, 258. In the embodiment depicted in FIG. 2B, the at least one astigmatism coil 254 may be positioned closest to the electron emitter 252 relative to the focusing coil 256 and the deflecting coil 258, and the focusing coil 256 may be positioned closer to the electron emitter 252 relative to the deflecting coil 258. However, this is merely illustrative, and other positions of the various coils relative to the electron emitter 252 are contemplated and included within the scope of the present disclosure.

The electron emitter 252 is generally an electron beam emitting component containing a filament/cathode and/or an anode electrically coupled to the power supply 260 via the gun control unit 262. The electron emitter 252 emits electrons into free space generally in a direction towards a space defined in the center of the coils 254, 256, 258 as a result of application of an electric current generated by the power supply 260. That is, the electrons emitted by the electron emitter 252 are generally directed in the direction indicated by dashed line 264 in FIG. 2B. In some embodiments, to ensure a directed emission of electrons therefrom, the electron emitter 252 may be formed into a particular shape that is adapted for such an electron emission. For example, the electron emitter 252 may be formed in a loop, as a tip having a particular radius of curvature, as one or more legs spaced apart from one another, and/or the like. The electron emitter 252 may be constructed of a particular material for emitting electrons, such as, for example, tungsten (W), lanthanum hexaboride ($LaB_6$), or the like. In some embodiments, the electron emitter 252 may be formed as the result of an etching process. An illustrative electron emitter may be provided by Energy Beam Sciences, Inc. (East Granby, CT). In one illustrative embodiment, the electron emitter 252 may produce a focusable electron beam with an accelerating voltage of about 60 kilovolts (kV) and with a beam power in the range of about 0 kilowatts (kW) to about 10 kW. It should be understood that the various features of the electron emitter 252 are merely illustrative, and that other features are also contemplated.

The at least one focusing coil 256 is generally a coil of electrically conductive material that has a plurality of turns/windings and is electrically coupled to a power source (e.g., the power supply 260). The at least one focusing coil 256 is positioned relative to the electron emitter 252 such that electrons emitted by the electron emitter are passed through a center of the at least one focusing coil 256 (e.g., a void defined by the plurality of turns/windings of the at least one focusing coil 256). That is, the at least one focusing coil 256 is oriented transverse to an axis defined by the dashed line 264 depicted in FIG. 2B. The arrangement and location of the at least one focusing coil 256 relative to the electron emitter 252 and/or the shape and size of the plurality of turns/windings may be such that, when an electrical current is applied across the at least one focusing coil 256, a magnetic field is generated in the void defined by the turns/windings. The magnetic field acts as a lens for the electrons emitted by the electron emitter 252, converging the electrons into an electron beam having a single focal point. As such, modification of the electrical current applied across the at least one focusing coil 256 alters the magnetic field, which in turn alters the focal point of the electron beam.

The at least one deflection coil 258 is generally a coil of electrically conductive material that has a plurality of turns/windings and is electrically coupled to a power source (e.g., the power supply 260). The at least one deflection coil 258 is positioned relative to the electron emitter 252 and/or the at least one focusing coil 256 such that electrons emitted by the electron emitter 252 and focused into a beam by the at least one focusing coil 256 are passed through a center of the at least one deflection coil 258 (e.g., a void defined by the plurality of turns/windings of the at least one deflection coil 258). That is, the at least one deflection coil 258 is oriented transverse to an axis defined by the dashed line 264 depicted in FIG. 2B. The arrangement and location of the at least one deflection coil 258 relative to the electron emitter 252 and/or the at least one focusing coil 256 and/or the shape and size of the plurality of turns/windings may be such that, when an electrical current is applied across the at least one deflection coil 258, a magnetic field and/or an electrical field is generated in the void defined by the turns/windings. The magnetic field and/or electrical field acts to direct the electron beam emitted by the electron emitter 252 and focused by the at least one focusing coil 256, causing the electron beam to be directed to a particular location based on the characteristics of the magnetic field and/or electrical field. As such, modification of the electrical current applied across the at least one deflection coil 258 alters the magnetic field and/or electrical field, which in turn alters the path of travel of the electron beam.

The at least one astigmatism coil 254 is generally a coil of electrically conductive material that has a plurality of turns/windings and is electrically coupled to a power source (e.g., the power supply 260). The at least one astigmatism coil 254 is positioned relative to the electron emitter 252 such that electrons emitted by the electron emitter 252 are passed through a center of the at least one astigmatism coil 254 (e.g., a void defined by the plurality of turns/windings of the at least one astigmatism coil 254). That is, the at least one astigmatism coil 254 is oriented transverse to an axis defined by the dashed line 264 depicted in FIG. 2B. The arrangement and location of the at least one astigmatism coil 254 relative to the electron emitter 252 and/or the shape and size of the plurality of turns/windings may be such that, when an electrical current is applied across the at least one astigmatism coil 254, a magnetic field is generated in the void defined by the turns/windings. The magnetic field acts to correct any focus defects present in the electrons emitted by the electron emitter 252, causing the electrons to converge in a beam that is radially uniform. As such, modification of the electrical current applied across the at least one astigmatism coil 254 alters the magnetic field, which in turn alters the electron beam distortion.

The various coils depicted in FIG. 2B (e.g., the at least one astigmatism coil 254, the at least one focusing coil 256, and the at least one deflection coil 258) are generally unshielded. That is, an iron shroud or similar shielding device, which is typical for coils in other EB guns, may not be present around one or more of the coils of the second EB gun 102. The omission of the shielding around the various coils depicted in FIG. 2B allows for the EB gun 102 to be optimized for speed rather than sensitivity. This is because shielding typically introduces more inductance, but makes focus response slow (e.g., when the shielding is present around the focusing coil 256). The lack of sensitivity optimization due to shielding is offset by the calibration process described herein. In some embodiments, one or more of the various coils may be surrounded by a reflector coil that is fed with the same current fed to the various coils, but in an opposite direction, such that the magnetic fields outside the various coils is canceled out.

While the embodiment of FIG. 2B only depicts three coils (e.g., the at least one astigmatism coil 254, the at least one focusing coil 256, and the at least one deflection coil 258), it should be understood that this is merely illustrative. Fewer or additional coils may be included within the EB gun 102 without departing from the scope of the present disclosure. In one particular embodiment, the EB gun 102 may include six coils therein, where at least one of the six coils is a focusing coil and at least one of the six coils is a deflection coil.

The power supply 260 is generally any component that provides electrical power to the components of the second EB gun 102 (e.g., the electron emitter 252, the at least one astigmatism coil 254, the at least one focusing coil 256, and/or the at least one deflection coil 258). The power supply 260 may have a plurality of power outputs, each of the plurality of power outputs coupled to one of the components of the second EB gun 102. As such, the power supply 260 can modulate the electricity provided to each of the component of the second EB gun 102 independently of one another. That is, a first voltage, frequency, and/or the like can be provided to a first component of the second EB gun 102 and a second voltage, frequency, and/or the like can be provided to a second component of the second EB gun 102. Control of the electricity provided to the various components of the second EB gun 102 may be achieved by the gun control unit 262, which is electrically coupled to the power supply 260 and/or each of the components of the second EB gun 102 (e.g., the electron emitter 252, the at least one astigmatism coil 254, the at least one focusing coil 256, and/or the at least one deflection coil 258). That is, the gun control unit 262 controls the electricity provided to each of the components of the second EB gun 102 to ensure that a particular voltage, a particular frequency, and/or the like is supplied to each component of the second EB gun 102 to ensure a particular control of the characteristics of the electron beam emitted by the second EB gun 102.

In some embodiments, the power supply 260 is a Tesla transformer, as it produces multi-megavolt pulses of very high power (e.g., on the order of tens of megawatts). In embodiments, the pulse repetition rate may be about twice the frequency of the supply mains, and may be limited only by a deionization time of a single spark-gap switch. When a high-voltage pulse is applied by the power supply 260, driving a cathode of the electron emitter 252 to a large negative potential, the electric field at the cathode face becomes so great that emission of electrons occurs. The electrons may be released normal to the face of the cathode and are accelerated through an evacuated region of a gun barrel of the second EB gun 102 by the electric field of the cathode through the magnetic fields and/or electrical fields produced by the various coils 254, 256, 258.

While only a single power supply 260 is depicted in FIG. 2B, it should be understood that a plurality of power supplies may also be used without departing from the scope of the present disclosure. That is, the second EB gun 102 may have a dedicated power supply for each of the components thereof in some embodiments. For example, the electron emitter 252 may have a first power supply and the various coils 254, 256, 258 may have a second power supply coupled thereto. In another example, the electron emitter 252 may have a first power supply coupled thereto, the at least one astigmatism coil 254 may have a second power supply coupled thereto, the at least one focusing coil 256 may have a third power supply coupled thereto, and the at least one deflection coil 258 may have a fourth power supply coupled thereto.

It should be understood that the second EB gun 102 may include other components that are not specifically recited herein. In a nonlimiting example, the second EB gun 102 may further include one or more focusing lens, one or more astigmatic lenses, one or more deflection lenses, one or more pumps (e.g., turbo pumps), one or more gate valves, one or more apertures, and/or the like. In some embodiments, the second EB gun 102 may include a plurality of columns (e.g., an upper column arranged above a lower column). Such columns may include a pressure differential therebetween (e.g., a pressure differential of about $10^{-4}$ mbar).

Referring again to FIGS. 1A-1B, the pressure in the build chamber 120 may be in the range of from about $1\times10^{-3}$ mBar to about $1\times10^{-6}$ mBar when forming the article 116 by fusing each successive powder layer 118 with the beams 151, 152. In some embodiments, the EB guns 101, 102 may be communicatively coupled to the analysis component 140, as indicated in FIGS. 1A-1B by the dashed line between the first EB gun 101 and the analysis component 140 and the dashed line between the second EB gun 102 and the analysis component 140. The communicative coupling of the EB guns 101, 102 to the analysis component 140 may provide an ability for signals and/or data to be transmitted between the EB guns 101, 102 and the analysis component 140, such as control signals from the analysis component 140 that direct operation of the EB guns 101, 102. That is, the analysis component 140 may transmit one or more signals to each of the EB guns 101, 102, the one or more signals directing operation of the EB guns 101, 102 independently of one another such that the EB guns 101, 102 can separately emit their respective beams 151, 152. However, due to the calibration processes and the calibrated movements and emissions of the EB guns 101, 102 described herein, the emission of the beams 151, 152 may be provided in such a manner to ensure operation of the EB guns 101, 102 in tandem with one another without causing interference and without the need for shielding.

Referring to FIG. 1A, the calibration probe 170 is generally supported by the build platform 114 in the build envelope 112. In some embodiments, the calibration probe 170 may be located in a location where each of the beams 151, 152 emitted by the EB guns 101, 102 can be received for the purposes of measurement and calibration, as described herein. For example, as shown in FIG. 1A, the calibration probe 170 is located generally in a center of the build envelope 112. However, it should be understood that such a location is merely illustrative and other locations are contemplated.

Referring to FIGS. 1A and 3A-3C, the calibration probe 170 is generally an array probe that includes an array of conducting thin threads of a metal, such as, for example, tungsten (W). The calibration probe 170 may include, for example, a three dimensional structure in the form of a calibration plate 171 that includes a top cover 172, an etched foil 174, a top base 176, and a dump plate 178 that are bound together in a stack, as particularly shown in FIG. 3B. The stack may be bound together via one or more coupling components 173 (e.g., bolts, screws, or the like). In some embodiments, various portions of the stack may be spaced apart from other portions via one or more spacers 175.

Figure 3A:
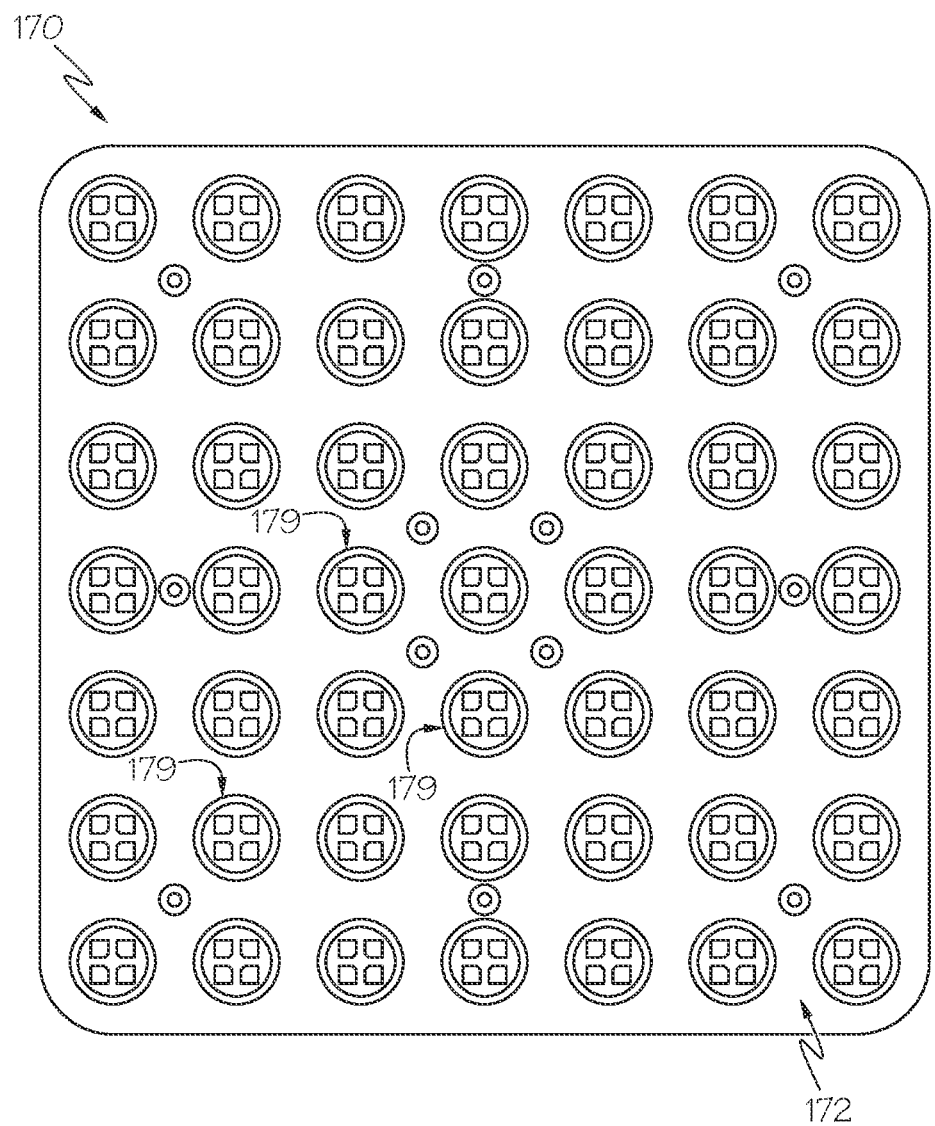
FIG. 3A schematically depicts a top view of the calibration probe of FIG. 1A, illustrating an array of measuring sites according to one or more embodiments shown and described herein.
Figure 3B:
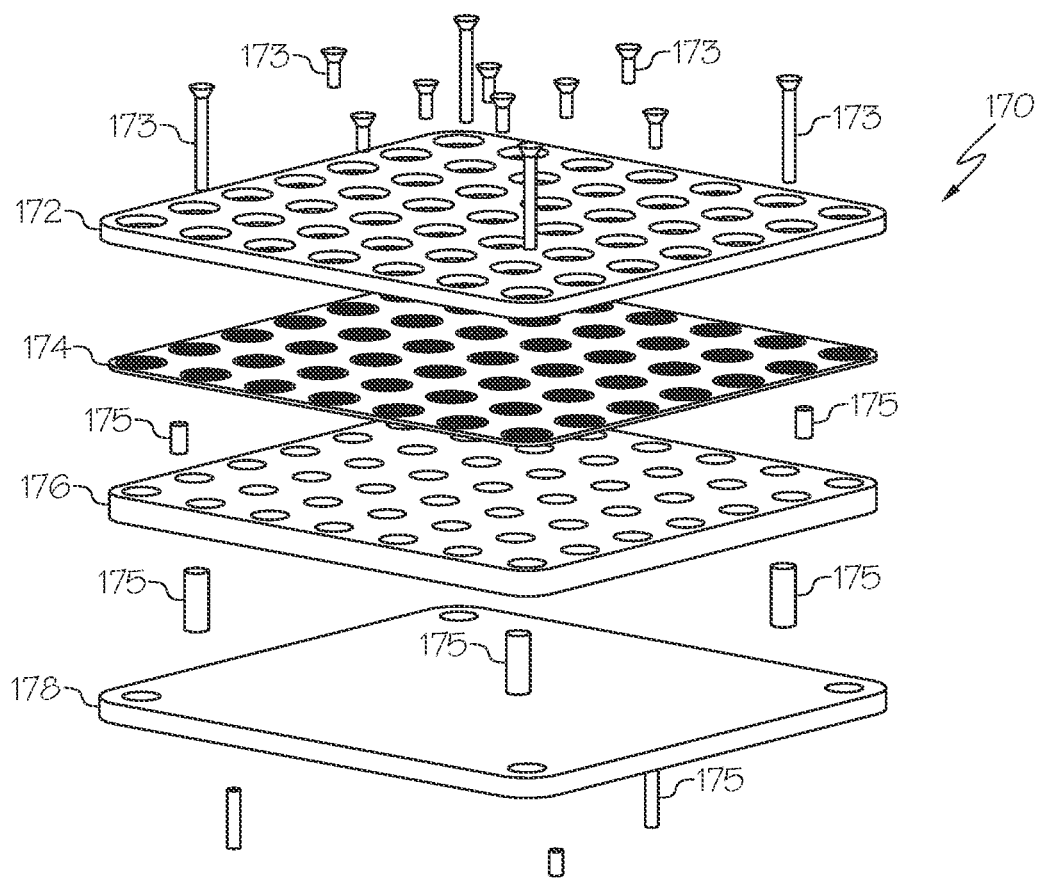
FIG. 3B schematically depicts an exploded side perspective view of the calibration probe of FIG. 1A according to one or more embodiments shown and described herein.

The top cover 172 of the calibration plate 171 is generally an uppermost portion of the calibration plate (e.g., exposed to the EB guns 101, 102 as shown in FIG. 1A). The top cover 172 may generally be planar and may include a plurality of openings therethrough that expose the various other components of the stack underneath, as shown in FIGS. 3A and 3B. In some embodiments, the top cover 172 may be constructed of a metal. In some embodiments, the top cover 172 may be constructed of a material that is different from the material used for the etched foil 174. In one nonlimiting example, the top cover 172 may be formed from aluminum. The shape and size of the top cover 172 is not limited by the present disclosure, and may generally be any shape and/or size that is sufficient to receive a plurality of beams thereon during a calibration process. In addition, the shape and size of the plurality of openings in the top cover 172 is also not limited by the present disclosure, and can each be any shape and/or size. In addition, the arrangement of the plurality of openings in the top cover 172 is not limited by the present disclosure. For example, the plurality of openings may be arranged in an array, as depicted in FIG. 3A. In some embodiments, the shape and size of the top cover 172 and the shape, size, and arrangement of the plurality of openings may be such that calibration of a plurality of beams can be completed as described herein. In some embodiments, the top cover 172 may have openings or the like that receive coupling components 173 (e.g., bolts, screws, or the like), spacers 175, and/or the like to hold the stack together when assembled.

Figure 3C:
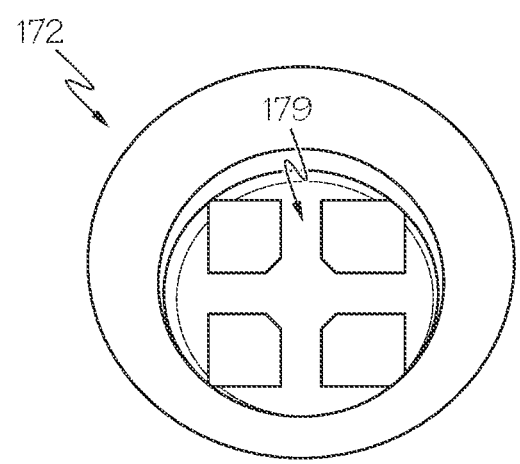
FIG. 3C schematically depicts a detailed top view of the calibration probe of FIG. 3A, illustrating one of the measuring sites according to one or more embodiments shown and described herein.

The etched foil 174 is generally positioned between the top cover 172 and the top base 176. The etched foil 174 may be generally planar and may include a plurality of patterned sites 179 thereon. The patterned sites 179 generally correspond in shape and location to the openings in the top cover 172 such that the patterned sites 179 are accessible through the top cover 172 when the stack is assembled as the calibration plate 171. The shape and pattern of each of the patterned sites 179 is generally not limited by this disclosure, but is generally a pattern that is stored in a repository such that it is recognizable from the data resulting from impingement, as described in greater detail herein. That is, as the electron beams impinge on the calibration probe 170, certain responses can be estimated based on the shape and pattern of the patterned sites 179. FIG. 3C depicts one illustrative example of the patterned sites 179. As shown in FIG. 3C, the patterned site is generally quadrangular shaped with a cross-like shape in the middle such that four areas in each corner of the quadrangular shape are openings through the etched foil 174, thereby exposing portions of the stack below the etched foil 174 (e.g., the top base 176 and/or the dump plate 178). In some embodiments, the etched foil 174 may be constructed of a metal. In some embodiments, the etched foil 174 may be constructed of a material that is different from the material used for the top cover 172. In one nonlimiting example, the etched foil 174 may be formed from tungsten. In some embodiments, the etched foil 174 may have openings or the like that receive coupling components 173 (e.g., bolts, screws, or the like), spacers 175, and/or the like to hold the stack together when assembled.

Referring to FIG. 3B, the top base 176 may generally be a planar component positioned between the etched foil 174 and the dump plate 178. The top base 176 may generally be planar and may include a plurality of openings therethrough that expose the various other components of the stack underneath, as shown in FIGS. 3A and 3B. In some embodiments, the top base 176 may be constructed of a metal. In some embodiments, the top base 176 may be constructed of a material that is different from the material used for the etched foil 174. In one nonlimiting example, the top base 176 may be formed from aluminum. The shape and size of the top base 176 is not limited by the present disclosure, and may generally be any shape and/or size that corresponds to the shape and/or size of the other components of the calibration plate 171. In addition, the shape and size of the plurality of openings in the top base 176 is also not limited by the present disclosure, and can each be any shape and/or size, particularly a shape and/or size that supports and/or corresponds to the openings in the top cover 172 and/or the patterned sites 179. In addition, the arrangement of the plurality of openings in the top base 176 is not limited by the present disclosure. For example, the plurality of openings may be arranged in an array in a manner such that they correspond in location to the openings in the top cover 172 and the patterned sites 179, as depicted in FIG. 3B. In some embodiments, the top cover 172 may have openings or the like that receive coupling components 173 (e.g., bolts, screws, or the like), spacers 175, and/or the like to hold the stack together when assembled.

Still referring to FIG. 3B, the dump plate 178 may generally be a planar component positioned to support the other components of the stack. That is, the dump plate 178 may be positioned underneath the top base 176 and may support the top base 176, the etched foil 174, and the top cover 172 thereon. In some embodiments, the dump plate 178 may be constructed of a material that is different from the material used for the etched foil 174. In one nonlimiting example, the dump plate 178 may be formed from aluminum. The shape and size of dump plate 178 is not limited by the present disclosure, and may generally be any shape and/or size that corresponds to the shape and/or size of the other components of the calibration plate 171. In some embodiments, the dump plate may be devoid of openings and passages in areas corresponding to the openings in the top cover 172 and/or the patterned sites 179 such that the dump plate 178 receives any electron beams that pass through the openings in the top cover 172 and the patterned sites 179. In some embodiments, the dump plate 178 may have openings or the like that receive coupling components 173 (e.g., bolts, screws, or the like), spacers 175, and/or the like to hold the stack together when assembled.

Referring again to FIGS. 1A and 3A-3C, the various components of the calibration probe 170 described herein, when arranged and configured such that, when the electron beams 151, 152 impinge a particular portion of the top cover 172, an electrical signal corresponding to the impingement is generated, which is detected by the oscilloscope 180 electrically coupled to the calibration probe. As the beams 151, 152 move to impinge on various parts of the calibration probe (e.g., moves from impinging the etched foil 174 over an edge so that it impinges the top base 176 and/or the dump plate 178), the resulting electrical signal that is generated and detected by the oscilloscope 180 changes.

It should be understood that the calibration probe 170 is merely one illustrative example of a device that is used for detecting responses. That is, in other embodiments, instead of a calibration probe, another device that can be configured for detecting responses may also be used without departing from the scope of the present disclosure.

Still referring to FIG. 1A, the oscilloscope 180 is generally any commercially available test instrument that is electrically coupled to the calibration probe 170 and configured to obtain information pertaining to the electrical response generated as a result of impingement of the beams 151, 152 on the calibration probe. The oscilloscope 180 may generally record the information pertaining to the electrical response as a change in electrical signal over time, with voltage and time as the Y- and X-axes, respectively, on a calibrated scale. The resulting waveform can be output to the sensing device 108, which analyzes the waveform for properties such as amplitude, frequency, rise time, time interval, distortion, and/or the like. As such, the oscilloscope 180 is generally any signal acquiring and/or analyzing device used for AC signals. In some embodiments, the oscilloscope 180 is positioned outside the build chamber 120 such that the harsh environment within the build chamber 120 does not interfere with operation of the oscilloscope 180. As such, the electrical connection between the oscilloscope 180 and the calibration probe 170 (as indicated by the solid line between the oscilloscope 180 and the calibration probe 170) may be completed via a vacuum feedthrough device or the like.

In some embodiments, the oscilloscope is an embedded system within a computing device that is programmed to receive the signals from the calibration probe 170 and/or one or more signals received from the sensing device 108 and determine a calibration as described herein. For example, such a computing device may complete both signal analysis and other analyses substantially concurrently. Such a computing device may be separate from the analysis component 140 or may be a part of the analysis component 140.

The sensing device 108 is generally located in an area within or adjacent to the build chamber 120 and positioned to obtain information regarding the each of the beams 151, 152 and/or information regarding emissions 153, 154 that result from impingement of the beams 151, 152. In some embodiments, the sensing device 108 may be an x-ray unit configured to obtain x-ray radiation emitted by impingement of the beams 151, 152 on the calibration probe 170, as described herein. In some embodiments, the sensing device 108 may be located in the exterior environment 123 outside the build chamber 120, yet positioned such that the field of view or sensed area of the sensing device 108 captures an area within the build chamber 120, such as a point of contact between each of the beams 151, 152 and the powder layer 118. In the embodiments where the sensing device 108 is positioned outside the build chamber 120, the harsh environment within the interior 122 of the build chamber 120 does not affect operation of the sensing device 108. That is, the heat, dust, metallization, and/or the like that occurs within the interior 104 of the build chamber 120 will not affect operation of the sensing device 108. In embodiments, the sensing device 108 is fixed in position such that a field of view or sensed area thereof remains constant (e.g., does not change). Moreover, the sensing device 108 is arranged in the fixed position such that a field of view or sensed area of the sensing device 108 encompasses an entirety of the build envelope 112. That is, the sensing device 108 is capable of sensing the entire build envelope 112 within the build chamber 120.

In some embodiments, the sensing device 108 is a device configured to sense one or more characteristics of the beams 151, 152 and/or the emissions 153, 154. For example, in some embodiments, the sensing device 108 may be configured to sense electromagnetic radiation, particularly an x-ray response generated as a result of impingement of the beams 151, 152 with the calibration probe 170. Thus, the sensing device 108 may generally be a device particularly tuned or otherwise configured to obtain information pertaining to the x-rays generated, such as a commercially available x-ray sensor or the like. As a result of the x-rays generated due to impingement of the electron beams 151, 152 on the calibration probe 170, the sensing device 108 may record the x-ray response, which can be used to determine a shape and fit the shape to a mathematical expression. The mathematical expression may be used to determine a beam spot size of the beams 151, 152 impinging on the calibration probe 170, which can be used to for the purposes of calibration, as described in greater detail herein.

In some embodiments, the sensing device 108 may be configured to sense an electrical response generated as a result of impingement of the electron beams 151, 152 on the calibration probe 170. In some embodiments, the sensing device 108 may be configured to sense back scattered electrons generated as a result of impingement of the electron beams 151, 152 on the calibration probe 170. In some embodiments, the sensing device 108 may be configured to sense photonic signals generated as a result of impingement of the electron beams 151, 152 on the calibration probe 170. In some embodiments, the sensing device 108 may be configured to sense any combination of the aforementioned characteristics that result of impingement of the electron beams 151, 152 on the calibration probe 170, including (but not limited to) any combination of x-rays, electrical response, back scattered electrons, and photonic signals. As such, the sensing device 108 may include one or more sensors therein. In some embodiments, the sensing device 108 may include a signal processing unit or the like. For example, the sensing device 108 may include a diode type sensor that transforms x-rays into electrical signals. A signal processing unit may then be used to filter and amplify the electrical signals before transmission of the signals to an analyzing device, such as, for example, the analysis component 140.

In some embodiments, the sensing device 108 may further be a device particularly configured to provide signals and/or data corresponding to the electrical or x-ray response, the mathematical expression, and/or the beam spot size to the analysis component 140. As such, the sensing device 108 may be communicatively coupled to the analysis component 140, as indicated by the dashed lines depicted in FIG. 1A between the sensing device 108 and the analysis component 140. While not depicted in FIG. 1A, the sensing device 108 may also be communicatively coupled to the oscilloscope such that signals generated by the sensing device 108 and the oscilloscope 180 can be transmitted between the sensing device 108 and the oscilloscope 180.

It should be understood that, due to the ability to remove the calibration probe 170, the oscilloscope 180, and the sensing device 108 (as depicted in FIG. 1B for example) it is possible to easily retrofit existing build chambers with a kit that includes the calibration probe 170, the oscilloscope 180, and the sensing device 108 so as to upgrade the existing build chambers with the capabilities described herein.

The analysis component 140 is generally a device that is communicatively coupled to one or more components of the additive manufacturing system 100 (e.g., the powder distributor 110, the sensing device 108, the oscilloscope 180 and/or each of the EB guns 101, 102) and is particularly arranged and configured to transmit and/or receive signals and/or data to/from the one or more components of the additive manufacturing system 100. Additional details regarding the analysis component 140 are discussed herein with respect to FIGS. 4A-4B.

Figure 4A:
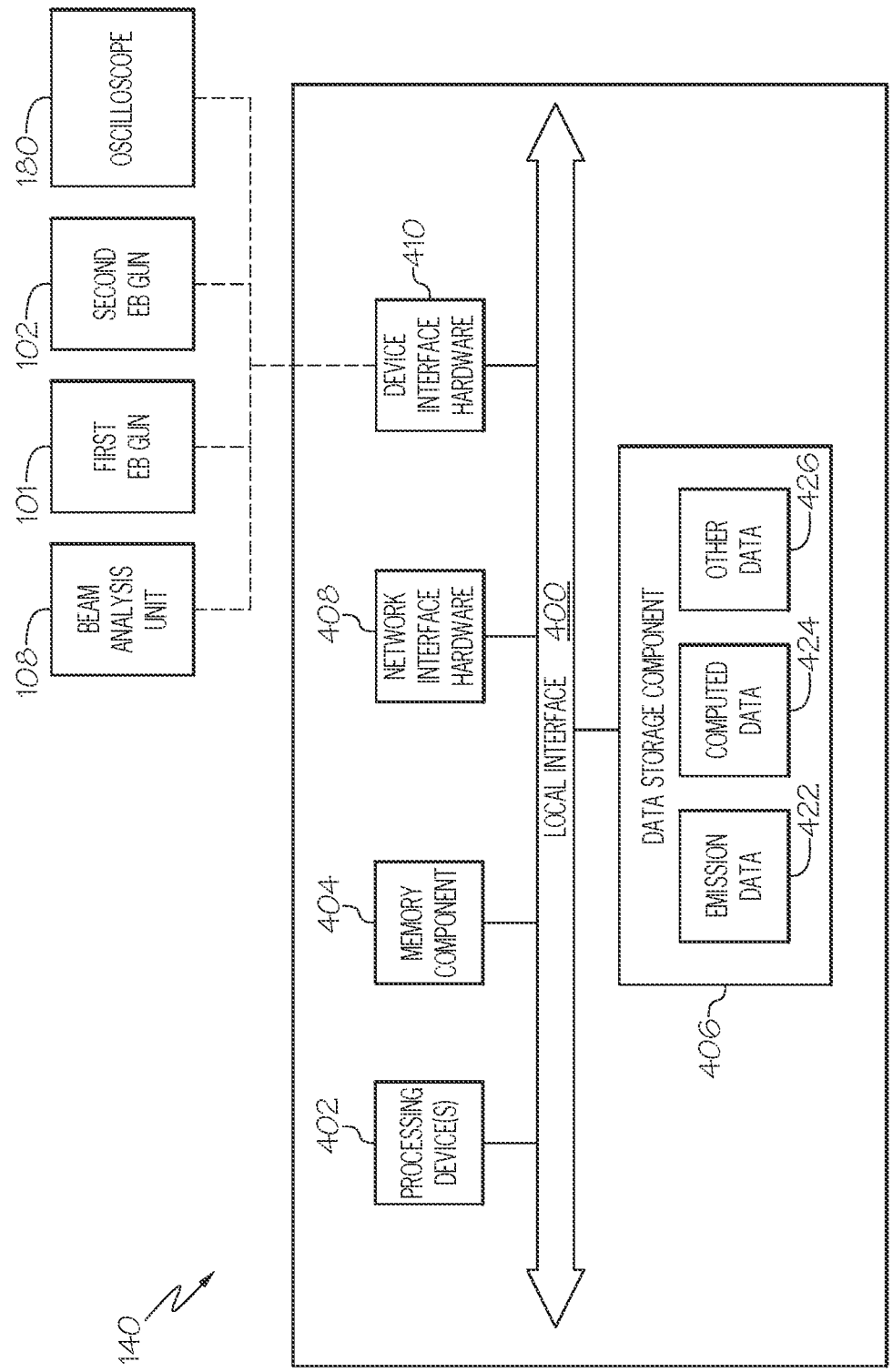
FIG. 4A schematically depicts a block diagram of illustrative components contained within a control unit according to one or more embodiments shown and described herein.

Turning to FIG. 4A, the various internal components of the analysis component 140 depicted in FIGS. 1A-1B is shown. Particularly, FIG. 4A depicts various system components for analyzing data received from the oscilloscope 180 and/or the sensing device 108 of FIG. 1A and/or assisting with the control of various components of the additive manufacturing system 100 depicted in FIGS. 1A-1B.

As illustrated in FIG. 4A, the analysis component 140 may include one or more processing devices 402, a non-transitory memory component 404, network interface hardware 408, device interface hardware 410, and a data storage component 406. A local interface 400, such as a bus or the like, may interconnect the various components.

The one or more processing devices 402, such as a computer processing unit (CPU), may be the central processing unit of the analysis component 140, performing calculations and logic operations to execute a program. The one or more processing devices 402, alone or in conjunction with the other components, are illustrative processing devices, computing devices, processors, or combinations thereof. The one or more processing devices 402 may include any processing component configured to receive and execute instructions (such as from the data storage component 406 and/or the memory component 404).

The memory component 404 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 404 may include one or more programming instructions thereon that, when executed by the one or more processing devices 402, cause the one or more processing devices 402 to complete various processes, such as the processes described herein with respect to FIGS. 7 and 10.

Figure 4B:
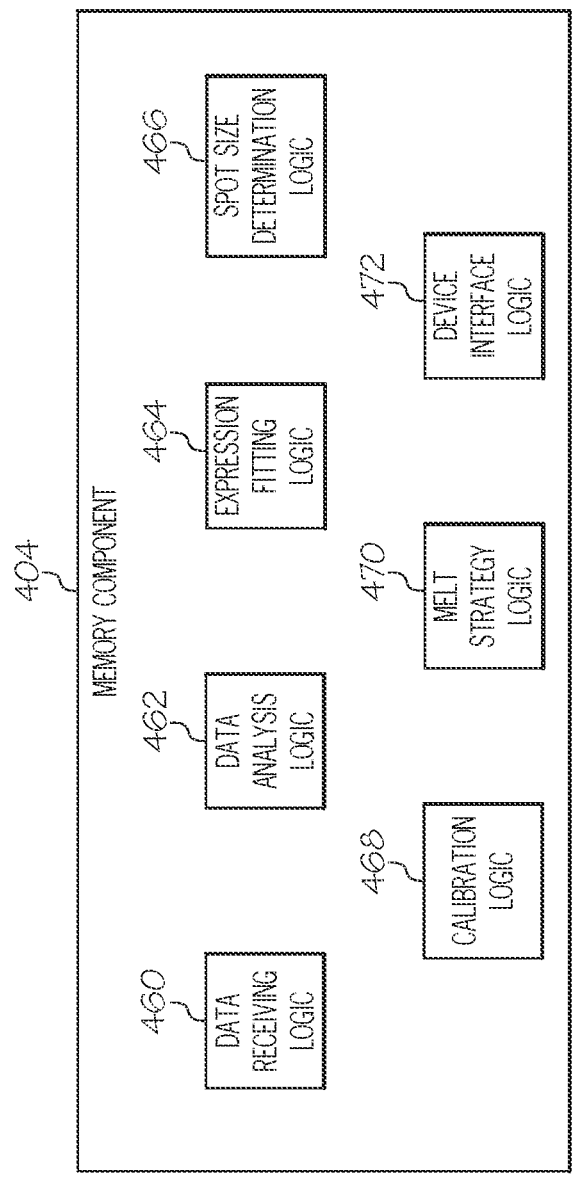
FIG. 4B depicts a block diagram of illustrative modules contained within a memory component of a control unit according to one or more embodiments shown and described herein.

Still referring to FIG. 4A, the programming instructions stored on the memory component 404 may be embodied as a plurality of software logic modules, where each logic module provides programming instructions for completing one or more tasks. FIG. 4B depicts the various modules of the memory component 404 of FIG. 4A according to various embodiments.

As shown in FIG. 4B, the memory component 404 includes a plurality of logic modules. Each of the logic modules shown in FIG. 4B may be embodied as a computer program, firmware, or hardware, as an example. Illustrative examples of logic modules present in the memory component 404 include, but are not limited to, data receiving logic 460, data analysis logic 462, expression fitting logic 464, spot size determination logic 466, calibration logic 468, melt strategy logic 470, and/or device interface logic 472.

Referring to FIGS. 4A and 4B, the data receiving logic 460 includes one or more programming instructions for receiving data from the sensing device 108 and/or the oscilloscope 180. That is, the data receiving logic 460 may cause a connection between the device interface hardware 410 and the sensing device 108 and/or a connection between the device interface hardware 410 and the oscilloscope 180 such that data transmitted by the sensing device 108 and/or the oscilloscope 180 is received by the analysis component 140. Further, the data transmitted by the sensing device 108 and/or the oscilloscope 180 may be stored (e.g., within the data storage component 406).

Referring to FIGS. 1A and 4B, the data analysis logic 462 includes one or more programming instructions for analyzing the data received from the sensing device 108 and/or the oscilloscope. That is, the data analysis logic 462 contains programming for analyzing the data pertaining to the electrical signals received from the oscilloscope 180 and/or data from the sensing device 108 that corresponds to the detected x-ray emissions that result from impingement of the beams 151, 152 on the calibration probe 170, as described herein. The data analysis logic 462 may further include programming instructions for analyzing data continuously as each of the beams 151, 152 moves relative to the calibration probe 170 and impinge on various portions of the calibration probe 170.

Still referring to FIGS. 1A and 4B, the expression fitting logic 464 includes one or more programming instructions for fitting the data corresponding to the electrical signals and/or the data corresponding to the x-ray emissions resulting from impingement of the beams 151, 152 on the calibration probe 170 to a mathematical expression. That is, the expression fitting logic 464 may contain programming for adapting the data for a convolution process (e.g., a mathematical faltung procedure) to produce an estimation of a spot size. More specifically, the expression fitting logic 464 assumes that a spot on the calibration probe 170 as indicated by the electrical data is Gaussian shaped. The expression fitting logic 464 utilizes a mathematical faltung procedure with an edge function to fit a Gaussian spot to the response (as derived from the x-ray data).

Still referring to FIGS. 1A and 4B, the spot size determination logic 466 includes one or more programming instructions for determining the size of the beam spot. That is, the spot size determination logic 466 may contain programming usable to take the data generated by the expression fitting logic 464 and determine a slope of the response. When the beam speed (e.g., the speed of movement of the electron beams 151, 152 across the calibration probe 170) is known (e.g., from data provided by the EB guns 101, 102), the slope of the response can be used to determine a spot size.

Referring to FIGS. 1A, 2A-2B and 4B, the calibration logic 468 includes one or more programming instructions for calibrating the EB guns 101, 102 such that movement of the guns is completed in a coordinated manner to avoid or minimize interaction of the respective beams 151, 152 emitted therefrom. That is, the calibration logic 468 may contain programming instructions for receiving information from the expression fitting logic 464 and/or the spot size determination logic 466, determining particular coil settings for each of the coils 204, 206, 208 of the first EB gun 101 that would minimize or avoid interaction of the first beam 151 with the second beam 152 based on anticipated movements of the first EB gun 101 and the second EB gun 102, determining particular coil settings for each of the coils 254, 256, 258 of the second EB gun 102 that would minimize or avoid interaction of the second beam 152 with the first beam 151 based on anticipated movements of the second EB gun 102 and the first EB gun 101, and transmitting one or more instructions to the first EB gun 101 and/or the second EB gun 102 to adjust the various settings of the respective coils thereof according to determined particular coil settings. In embodiments, the one or more programming instructions for transmitting one or more instructions to the first EB gun 101 and/or the second EB gun 102 may include transmitting instructions to the one or more power supplies 210, 260 and/or the gun control units 212, 262 of the respective EB guns 101, 102.

Referring to FIGS. 1A-1B and 4B, in some embodiments, calibrating the EB guns 101, 102 (e.g., directing adjustment of the settings of the various coils 204, 206, 208 and 254, 256, 258 thereof) using the calibration logic 468 may be completed according to a particular melt strategy to be completed. That is, an anticipated target location of the beams 151, 152 emitted from the respective EB guns 101, 102 throughout a melting process may be determined prior to calibrating the EB guns 101, 102 such that the locations are factored into the calibration process. As such, the melt strategy logic 470 includes programming instructions for determining a programmed movement of the EB guns 101, 102, determining a precision mode to be used at particular times for each of the EB guns 101, 102, and transmitting instructions to each of the EB guns 101, 102 accordingly, as described in greater detail herein.

Referring to FIGS. 1A-1B and 4A-4B, the device interface logic 472 includes one or more programming instructions for establishing communicative connections with the various devices or components of the additive manufacturing system 100. For example, the device interface logic 472 may include programming instructions usable to establish connections with the powder distributor 110, the first EB gun 101, and/or the second EB gun 102 in various embodiments. In another example, the device interface logic 472 may contain programming instructions for working in tandem with the programming instructions of the data receiving logic 460 to establish connections with the sensing device 108 and/or the oscilloscope 180.

Referring again to FIG. 4A, the network interface hardware 408 may include any wired or wireless networking hardware, such as a modem, LAN port, wireless fidelity (Wi-Fi) card, WiMax card, long term evolution (LTE) card, mobile communications hardware, and/or other hardware for communicating with other networks and/or devices. For example, the network interface hardware 408 may be used to facilitate communication between external storage devices, user computing devices, server computing devices, external control devices, and/or the like via a network, such as, for example, a local network, the Internet, and/or the like, as described herein with respect to FIG. 5.

Referring to FIGS. 1A-1B, 2A-2B, and 4A, the device interface hardware 410 may communicate information between the local interface 400 and one or more components of the additive manufacturing system 100 of FIGS. 1A-1B, particularly the sensing device 108, the oscilloscope 180, the first EB gun 101, and/or the second EB gun 102. In some embodiments, the device interface hardware 410 may transmit or receive signals and/or data to/from the first EB gun 101 and/or the second EB gun 102, transmit control signals to one or more of the gun control units 212, 264 to effect control of the EB guns 101, 102 and/or components thereof (e.g., the coils 204, 206, 208 of the first EB gun 101, the coils 254, 256, 258 of the second EB gun 102, the one or more power supplies 210 of the first EB gun 101, the one or more power supplies 260 of the second EB gun 102, the electron emitter 202 of the first EB gun 101, the electron emitter 252 of the second EB gun 102, and/or the like). In some embodiments, the device interface hardware 410 may transmit or receive signals and/or data to/from the sensing device 108. In some embodiments, the device interface hardware 410 may transmit or receive signals and/or data to/from the oscilloscope 180.

Referring again to FIG. 4A, the data storage component 406, which may generally be a storage medium, may contain one or more data repositories for storing data that is received and/or generated. The data storage component 406 may be any physical storage medium, including, but not limited to, a hard disk drive (HDD), memory, removable storage, and/or the like. While the data storage component 406 is depicted as a local device, it should be understood that the data storage component 406 may be a remote storage device, such as, for example, a server computing device, cloud based storage device, or the like. Illustrative data that may be contained within the data storage component 406 includes, but is not limited to, emission data 422, computed data 424, and/or other data 426. Referring also to FIG. 1A, the emission data 422 may generally be data that is generated and/or received as a result of a measurement of the electron beams 151, 152 as they impinge on the calibration probe 170. The emission data 422 may be generated by, for example, the sensing device 108 and/or the oscilloscope 180. In some embodiments, the emission data 422 may be transmitted by the sensing device 108 and/or the oscilloscope 180.

Referring again to FIG. 4A, the computed data 424 may be data that is generated as a result of fitting the shape according to the data corresponding to the electrical response and/or data corresponding to the x-ray response to a mathematical expression, determining a beam spot size, and/or determining whether an interaction occurs upon movement of the EB guns 101, 102 (FIG. 1A), as described in greater detail herein. Still referring to FIG. 4A, the other data 426 may generally be any other data that is usable for the purposes of calibrating the EB guns 101, 102 (FIGS. 1A-1B), determining a melt strategy, executing the melt strategy, and/or the like, as described herein.

It should be understood that the components illustrated in FIG. 4A are merely illustrative and are not intended to limit the scope of this disclosure. More specifically, while the components in FIG. 4A are illustrated as residing within the analysis component 140, this is a nonlimiting example. In some embodiments, one or more of the components may reside external to the analysis component 140.

Figure 5:
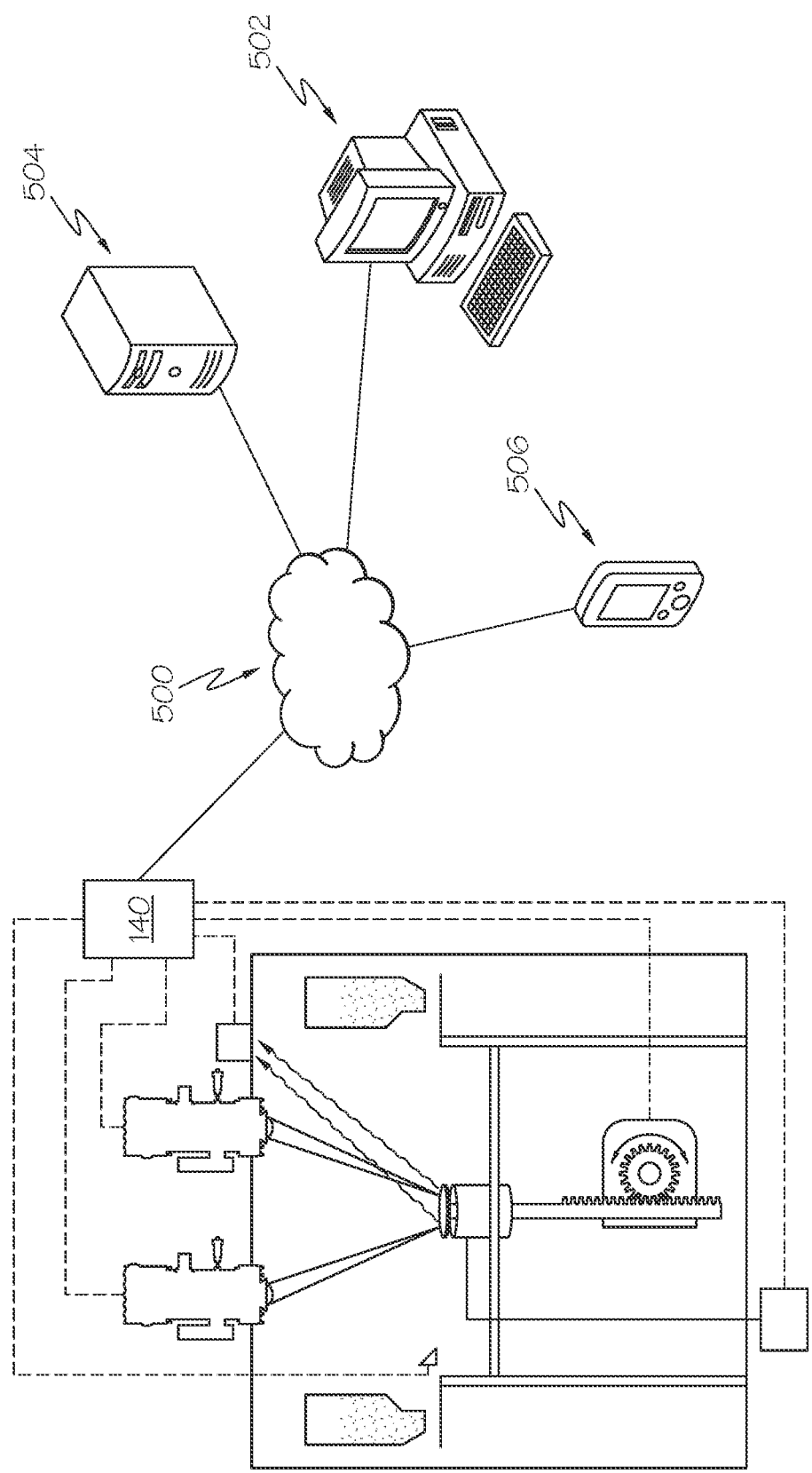
FIG. 5 depicts an illustrative control network according to one or more embodiments shown and described herein.

Referring now to FIG. 5, an illustrative control network 500 is depicted. As illustrated in FIG. 5, the control network 500 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The control network 500 may generally be configured to electronically connect one or more systems and/or devices, such as, for example, computing devices, servers, electronic devices, additive manufacturing systems, and/or components of any of the foregoing. Illustrative systems and/or devices may include, but are not limited to, a user computing device 502, a database server 504, an electronic device 506, and/or the analysis component 140 of the additive manufacturing system 100 of FIGS. 1A-1B.

Still referring to FIG. 5, the user computing device 502 may generally be used as an interface between a user and the other components connected to the control network 500. Thus, the user computing device 502 may be used to perform one or more user-facing functions, such as receiving one or more inputs from a user or providing information to the user. Accordingly, the user computing device 502 may include at least a display and/or input hardware. In the event that any of the other devices connected to the control network 500 (e.g., the database server 504, the electronic device 506, and/or the analysis component 140), requires oversight, updating, and/or correction, the user computing device 502 may be configured to provide the desired oversight, updating, and/or correction. The user computing device 502 may also be used to input data that is usable to determine a type of material being used for additive manufacture, a number of EB guns to utilize, a desired strategy for forming an article using the additive manufacturing system 100 (e.g., EB gun movement strategy), and/or the like. That is, a user may input information via the user computing device 502 to control various parameters of the additive manufacturing process.

The database server 504 is generally a repository of data that is used for the purposes of calibrating the EB guns and/or employing a particular melt strategy as described herein. That is, the database server 504 may contain one or more storage devices for storing data pertaining to information received from the sensing device 108 and/or the oscilloscope 180 (FIG. 1A), any generated calculations, and/or the like. In some embodiments, the database server 504 may contain information therein that mirrors the information stored in the data storage component 406 (FIG. 4A) or may be used as an alternative to the data storage component 406 (FIG. 4A), such as an offsite data repository. The database server 504 may be accessible by one or more other devices and/or systems coupled to the control network 500 and may provide the data as needed.

The electronic device 506 may generally be any device that contains hardware that is operable to be used as an interface between a user and the other components of the control network 500. Thus, the electronic device 506 may be used to perform one or more user-facing functions, such as, for example, receiving data one or more external components, displaying information to a user, receiving one or more user inputs, transmitting signals corresponding to the one or more user inputs, and/or the like. While FIG. 5 depicts the electronic device 506 as a smart phone, it should be understood that this is a nonlimiting example. That is, the electronic device 506 may be any mobile phone, a tablet computing device, a personal computing device (e.g., a personal computer), and/or the like.

It should be understood that while the user computing device 502 is depicted as a personal computer, the database server 504 is depicted as a server, and the electronic device 506 is depicted as a mobile device, these are nonlimiting examples. In some embodiments, any type of computing device (e.g., mobile computing device, personal computer, server, cloud-based network of devices, etc.) or specialized electronic device may be used for any of these components. Additionally, while each of these computing devices is illustrated in FIG. 5 as a single piece of hardware, this is also merely an example. Each of the user computing device 502, the database server 504, and the electronic device 506 may represent a plurality of computers, servers, databases, components, and/or the like.

While FIG. 5 depicts the various systems and/or components communicatively coupled to one another via the control network 500, this is merely illustrative. In some embodiments, various components may be communicatively coupled to one another via a direct connection. In some embodiments, various components may be integrated into a single device.

The various embodiments depicted in FIGS. 1A-1B, 2A-2B, 3A-3C, 4A-4B, and 5 should now generally be understood. That is, the embodiments depicted in FIG. 1A-1B includes the build chamber 120 with a plurality of EB guns (e.g., the first EB gun 101 and the second EB gun 102). As depicted in the embodiments of FIGS. 2A and 2B, each of the plurality of EB guns includes an electron emitter and a plurality of coils, each of which are adjustable to cause the electron beam emitted by each EB gun to exhibit certain characteristics. In the embodiment depicted in FIGS. 3A-3C, the calibration probe 170 contains a plurality of plates arranged in a stack and electrically coupled to the oscilloscope 180 (FIG. 1A), which measures an electrical response as a result of impingement of the electron beams 151, 152 (FIG. 1A) on the calibration probe. However, it should be understood that this is merely an illustrative example. In the embodiment depicted FIGS. 4A-4B, the analysis component 140 may include various internal components that provide functionality for the analysis component 140 to determine characteristics of the electron beams emitted from each of the plurality of EB guns, determine a calibration of each of the plurality of EB guns that avoids or minimizes interaction between electron beams, and directs adjustment of the coils in each of the plurality of EB guns. Further, external control of the various components of FIGS. 1A-1B, 2A-2B, 3A-3C, and 4A-4B can be completed using one or more of the components depicted in the embodiment of FIG. 5.

In operation, during a calibration cycle, the calibration probe 170 is placed on the build platform 114 and the build platform 114 is adjusted (e.g., raised or lowered) such that a top surface of the calibration probe 170 is generally aligned with the powder distributor 110. That is, a top surface of the calibration probe is generally at a height corresponding to where the powder layer being fused would be if the powder layer was on the build platform 114 to ensure an accurate calibration. The EB guns 101, 102 may be aimed and activated to emit the electron beams 151, 152. Data is measured from the impingement of the electron beams 151, 152 on the calibration probe 170 and is processed for the purposes of calibrating the EB guns, as described in greater detail herein.

During a work cycle (e.g., after the EB guns 101, 102 have been calibrated according to the calibration cycle), the build platform 114 may be lowered successively in relation to the EB guns 101, 102 (e.g., in the −y direction of the coordinate axes depicted in FIG. 1B) after each added powder layer 118 is placed. This means that the build platform 114 starts in an initial position, in which a first powder layer 118 of a particular thickness is laid down on the build platform. In some embodiments, the first powder layer 118 may be thicker than the other applied layers, so as to avoid a melt-through of the first layer onto the build platform 114. The build platform 114 is thereafter lowered in connection with laying down a second powder layer 118 for the formation of a new cross section of the article 116. In an example embodiment, the article 116 may be formed through successive fusion of layers the raw material supplied from the raw material hoppers 106, 107 on the build platform 114 (e.g., successive fusion of layers of powder layer 118). Each layer corresponds to successive cross sections of the article 116. Such a fusion may be particularly completed based on instructions generated from a model the article 116. In some embodiments, the model may be generated via a CAD (Computer Aided Design) tool.

In embodiments, the plurality of EB guns 101, 102 each generate a respective electron beam 151, 152 that, when contacting the raw material located on the build platform 114, melts or fuses together the raw material to form a first layer of the powder layer 118 on the build platform 114. In some embodiments, the analysis component 140 may be used for calibrating, controlling, and managing the each of the electron beams 151, 152 emitted from the respective EB guns 101, 102 by transmitting one or more signals and/or data to the EB guns 101 to adjust the coils 204, 206, 208 and 254, 256, 258 thereof, adjust the electron emitters 202, 252 thereof, and/or the like. In an illustrative embodiment, the EB guns 101, 102 each generate a focusable electron beam with an accelerating voltage of about 60 kilovolts (kV) and with a beam power in the range of about 0 kilowatts (kW) to about 3 kW. A pressure in the interior 104 of the build chamber 120 may be in the range of about $10^{-3}$ millibars (mBar) to about $10^{-6}$ mBar when constructing the article 116 by fusing each successive powder layer 118 with the electron beams 151, 152.

In embodiments, a particular amount of raw material may be provided on the build platform 114. The particular amount of raw material is provided on the build platform 114 from one or more of the raw material hoppers 106, 107, in which the raw material is ejected through the respective outlets on the raw material hoppers 106, 107, thereby creating a screen of raw material on the build platform 114. It should be understood that the use and arrangement of the raw material hoppers 106, 107 to supply the raw material used for forming the powder layer 118 described herein is merely illustrative. That is, other arrangements of supplying and providing raw material, such as a powder container with a moving floor located outside the build chamber 120 or the like is also contemplated and included within the scope of the present disclosure.

In embodiments, a layer from the raw material may be provided on build platform 114. The layer from the raw material may then be collected by the powder distributor 110 by moving the powder distributor 110 a particular distance in a first direction (e.g., in a direction along the plane formed by the x-axis and the y-axis of the coordinate axes depicted in FIG. 1B) into the scree of the raw material, thereby allowing a particular amount of the raw material to fall over a top of the powder distributor 110. The powder distributor 110 is then moved in a second direction (e.g., in another direction along the plane formed by the x-axis and the y-axis of the coordinate axes depicted in FIG. 1B). In some embodiments, the second direction may be opposite to the first direction. Movement of the powder distributor 110 in the second direction may remove the particular amount of the raw material, which has fallen over the top of the powder distributor 110, from the scree of the raw material.

The particular amount of the raw material removed from the scree of the raw material (or provided by any other suitable mechanism) in front of the powder distributor 110 (e.g., adjacent to a leading end of the powder distributor 110) may be moved over the build envelope 112 and/or the build platform 114 by means of the powder distributor 110, thereby distributing the particular amount of the raw material over the build platform 114.

The electron beams 151, 152 emitted from the EB guns 101, 102 may be directed over the build platform 114, thereby causing the powder layer 118 to fuse in particular locations to form a first cross section of the article 116 according to the model generated via the CAD tool. The movement of the electron beams 151, 152 is controlled by the EB guns 101 (including the components thereof, as described herein) such that the electron beams 151, 152 are directed over the build platform 114 based on instructions provided by the analysis component 140 or another device. As described herein, the electron beams 151, 152 are calibrated with respect to one another to avoid or minimize interaction between the electron beams 151, 152. Further, as described herein, the electron beams 151, 152 are adjusted for a high precision mode or a low precision mode depending on the area of the article 116 being formed and the location and movement of each of the electron beams 151, 152 with respect to one another.

After a first powder layer 118 is finished (e.g., after the fusion of raw material for making a first layer of the article 116), a second powder layer 118 is provided on the first powder layer 118. The second powder layer 118 may be distributed according to the same manner as the previous layer, as described herein. However, in some embodiments, there might be alternative methods in the same additive manufacturing machine for distributing the raw material. For instance, a first layer may be provided by means of a first powder distributor and a second layer may be provided by a second powder distributor.

After the second powder layer 118 is distributed on the first powder layer 118, the calibrated electron beams 151, 152 are directed over the build platform 114, causing the second powder layer 118 to fuse in selected locations to form a second cross section of the article 116. Fused portions in the second layer may be bonded to fused portions of said first layer. The fused portions in the first and second layer may be melted together by melting not only the material in the uppermost layer but also remelting at least a portion of a thickness of a layer directly below the uppermost layer.

Figure 6:
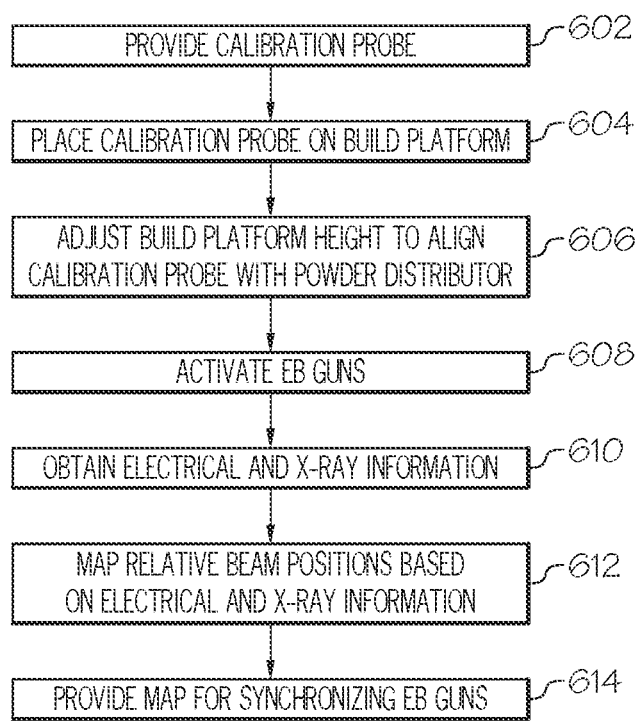
FIG. 6 depicts a flow diagram of an illustrative overview method of calibrating a plurality of electron beam emitters in an additive manufacturing system according to one or more embodiments shown and described herein.

FIG. 6 schematically depicts a block diagram of an illustrative overview method of calibrating the EB guns depicted in FIG. 1A. Referring to FIGS. 1A and 6, the calibration probe 170 is provided at block 602. In addition to the calibration probe 170, the oscilloscope 180 and the sensing device 108 are also provided. As described herein, the calibration probe 170, the oscilloscope 180, and the sensing device may be provided as a kit of parts that is added to an existing additive manufacturing system 100 in some embodiments. Providing the calibration probe 170 according to block 602 may also include electrically coupling the calibration probe 170 to the oscilloscope 180, which may be completed via a vacuum feedthrough in a wall of the build chamber 120, as described herein. The oscilloscope 180 and the sensing device 108 are also communicatively coupled to the analysis component 140.

At block 604, the calibration probe 170 is placed on the build platform 114 within the build chamber 120. To ensure that the calibration probe 170 accurately measures the beams 151, 152 emitted by the EB guns 101, 102, the build platform 114 can be adjusted at block 606 to align the calibration probe 170 with the powder distributor such that the calibration probe 170 is about the same height of the powder layer 118 (FIG. 1B) during a EBM process, as described herein. That is, the build platform 114 is adjusted at block 606 such that distance between the calibration probe 170 and the EB guns 101, 102 is about the same distance as would be expected between the powder layer 118 (FIG. 1B) and the EB guns 101, 102 during an EBM process.

At block 608, the EB guns 101, 102 are activated such that the electron beams 151, 152 impinge on the calibration probe 170, generating an electrical response that is recorded by the oscilloscope 180. In addition, the impingement generates x-ray radiation, which is detected by the sensing device 108. The information from the oscilloscope 180 and the sensing device 108 is obtained at block 610 (e.g., obtained by the analysis component 140) and is used to map the relative beam positions at block 612. The map that is generated is then provided at block 614 for synchronizing the EB guns 101, 102 (e.g., synchronizing the coils thereof) to avoid or minimize interaction between the EB guns 101, 102 or components thereof.

Figure 7:
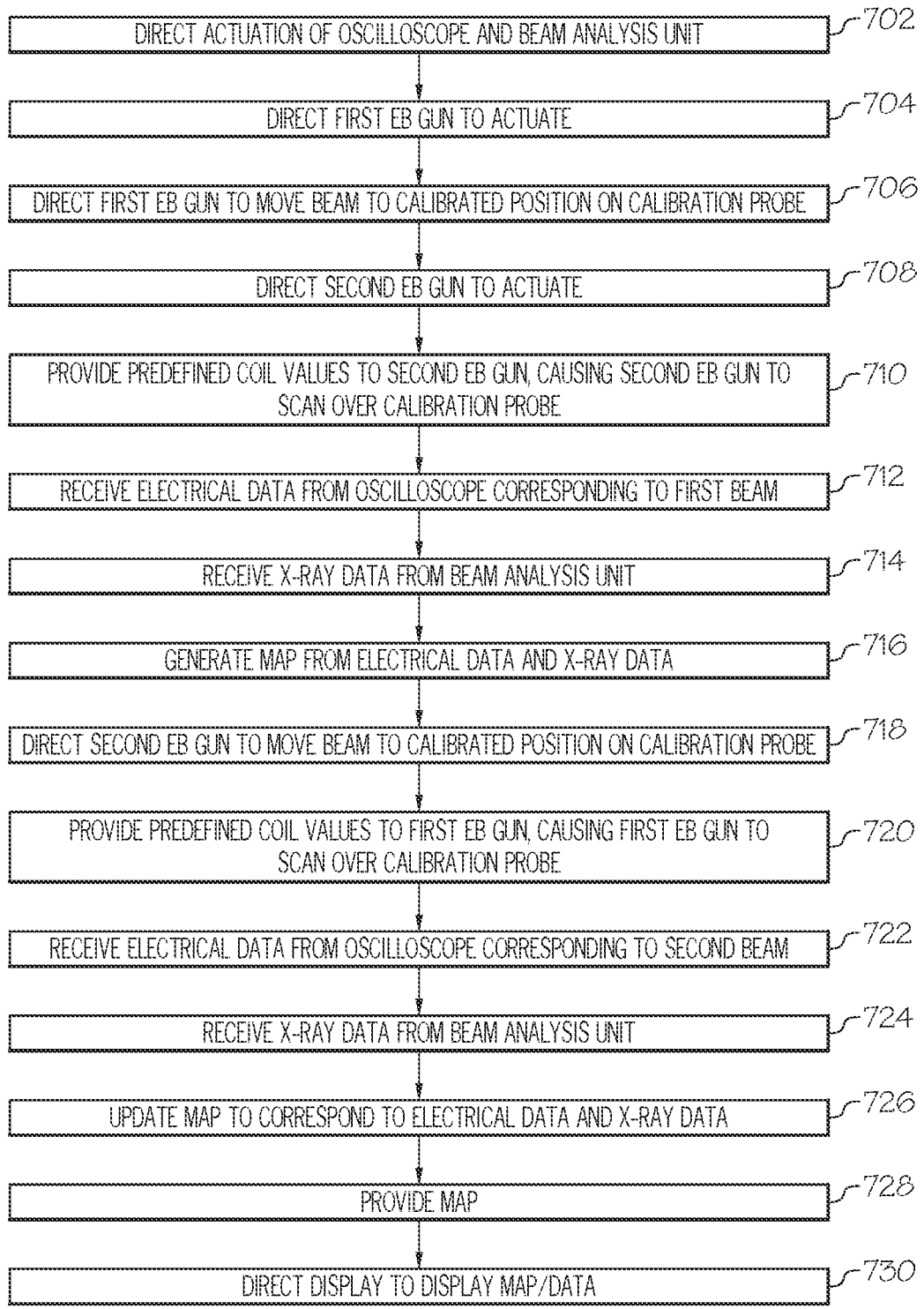
FIG. 7 depicts a flow diagram of an illustrative method of calibrating a plurality of electron beam emitters using an analysis component according to one or more embodiments shown and described herein.

FIG. 7 schematically depicts a block diagram of an illustrative method of calibrating the EB guns 101, 102 in the embodiment depicted in FIG. 1A for use concurrently to form the article 116. While FIG. 7 relates to the calibration of two EB guns, it should be understood that the processes described with respect to FIG. 7 may be completed for any number of EB guns, including 3 EB guns, 4 EB guns, 5 EB guns, 6 EB guns, or greater than 6 EB guns. In addition, the processes described with respect to FIG. 7 generally relate to processes carried out by the analysis component 140 (FIG. 1A). However, it should be understood that other components may be used in addition to, in lieu of, or in conjunction with the analysis component 140 in each of the processes described in FIG. 7 without departing from the scope of the present disclosure.

Referring to FIGS. 1A and 7, the analysis component 140 may direct actuation of the oscilloscope 180 and the sensing device 108 at block 702. Directing actuation may include, for example, providing an actuation signal or the like to the oscilloscope 180 and/or the sensing device 108, directing power to be supplied to the oscilloscope 180 and/or the sensing device 108, and/or the like. In some embodiments, the oscilloscope 180 and/or the sensing device 108 may be actuated and ready to sense without receiving an actuation signal or the like from the analysis component 140. In such embodiments, the process according to block 702 may be omitted. It should be understood that no actuation of the calibration probe 170 is necessary, as the calibration probe 170 is a passive device.

At block 704, the analysis component 140 directs the first EB gun 101 to actuate. That is, referring also to FIG. 2A, the analysis component 140 transmits a signal to the power supply 210 and/or the gun control unit 212 to actuate the electron emitter 202, the at least one astigmatism coil 204, the at least one focusing coil 206, and/or the at least one deflection coil 208. Actuation of the components of the first EB gun 101 cause the electron beam 151 to be emitted from the EB gun 101.

Figure 8A:
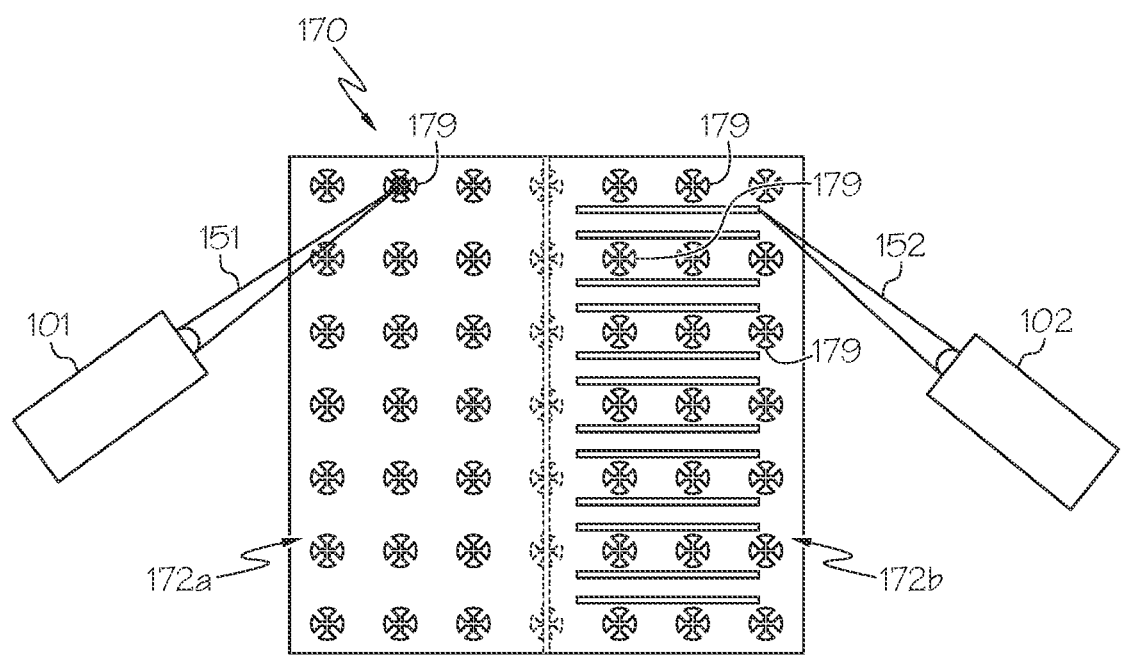
FIG. 8A schematically depicts movement of a first electron beam emitter relative to a second electron beam emitter during a calibration process according to one or more embodiments shown and described herein.

In addition to directing actuation, the analysis component 140 may also direct the EB gun 101 to move the electron beam 151 to a calibrated position on the calibration probe 170 at block 706. That is, the analysis component 140 may provide one or more signals to the power supply 210 and/or the gun control unit 212 to adjust the electrical power supplied to one or more of the coils (e.g., the at least one astigmatism coil 204, the at least one focusing coil 206, and/or the at least one deflection coil 208) such that the electron beam 151 is aimed at a particular location on the calibration probe 170. For example, as shown in FIG. 8A, the first EB gun 101 emits the beam 151 towards a first portion 172a of the calibration probe 170 as a result of the signals received from the analysis component 140. More specifically, the first EB gun 101 emits the beam 151 to one or more particular locations within one of the patterned sites 179 on the first portion 172a of the calibration probe 170. In some embodiments, the beam 151 may be emitted such that it impinges on a static location on one of the patterned sites 179. In other embodiments, the beam 151 may be emitted such that it moves according to a predetermined pattern (e.g., executes a scan function) over one of the patterned sites 179 such that it impinges various layers in the stack depicted in FIG. 3B (e.g., sweeps across the patterned site 179), as described herein.

Referring again to FIGS. 1A, 2B and 7, at block 708, the analysis component 140 directs the second EB gun 102 to actuate. That is, referring also to FIG. 2B, the analysis component 140 transmits a signal to the power supply 260 and/or the gun control unit 262 to actuate the electron emitter 252, the at least one astigmatism coil 254, the at least one focusing coil 256, and/or the at least one deflection coil 258. Actuation of the components of the second EB gun 102 cause the electron beam 152 to be emitted from the second EB gun 102. In addition to directing actuation, the analysis component 140 may also provide predefined coil values to the second EB gun 102 to cause the second EB gun 102 to move the electron beam 152 in a predetermined pattern according to the predefined coil values on the calibration probe 170 at block 710. That is, the analysis component 140 may provide one or more signals to the power supply 260 and/or the gun control unit 262 over a period of time to adjust the electrical power supplied to one or more of the coils (e.g., the at least one astigmatism coil 254, the at least one focusing coil 256, and/or the at least one deflection coil 258) such that the electron beam 152 moves according to a particular pattern on the calibration probe 170. For example, as shown in FIG. 8A, the second EB gun 102 emits the beam 152 towards a second portion 172b of the calibration probe 170 as a result of the signals received from the analysis component 140 and continues to move the beam 152 along a pattern, as indicated by the lines located in between the various patterned sites 179 on the second portion 172b. In some embodiments, the pattern may be located such that the beam 152 does not impinge on any of the patterned sites 179 on the second portion 172b when moving according to the pattern. In other embodiments, the pattern may be located such that the beam 152 does cross over one or more of the patterned sites 179 on the second portion 172b when moving according to the pattern.

Referring again to FIGS. 1A, 7, and 8A, the analysis component 140 receives electrical data from the oscilloscope 180 that corresponds to the impingement of the first beam 151 on the first portion 172a of the calibration probe 170 at block 712. The electrical data generally includes the electrical response generated as a result of impingement of the first beam 151 on the first portion 172a of the calibration probe 170 over a measured period of time. An illustrative example of a graphical depiction of the electrical data received from the oscilloscope 180 is shown in a plot section 914 of a user interface 900 depicted in FIG. 9. As shown in the plot section 914, the voltage spikes at various intervals, the spikes corresponding to times when an event occurs. The event may be, for example, an instance where the first beam 151 moves from impinging on the dump plate 178 (FIG. 3B) to impinging on the etched foil 174 (FIG. 3B). That is, the tungsten of the etched foil 174 (FIG. 3B) causes the spike in voltage.

Referring again to FIGS. 1A and 7, the analysis component 140 receives x-ray data from the sensing device 108 that corresponds to x-ray emissions that result from impingement of the first beam 151 and the second beam 152 on the calibration probe 170 at block 714. The x-ray data generally includes times that are synchronized with the data received from the oscilloscope 180 such that an x-ray emission reading can be correlated to the spikes in voltage, as described herein.

Figure 9:
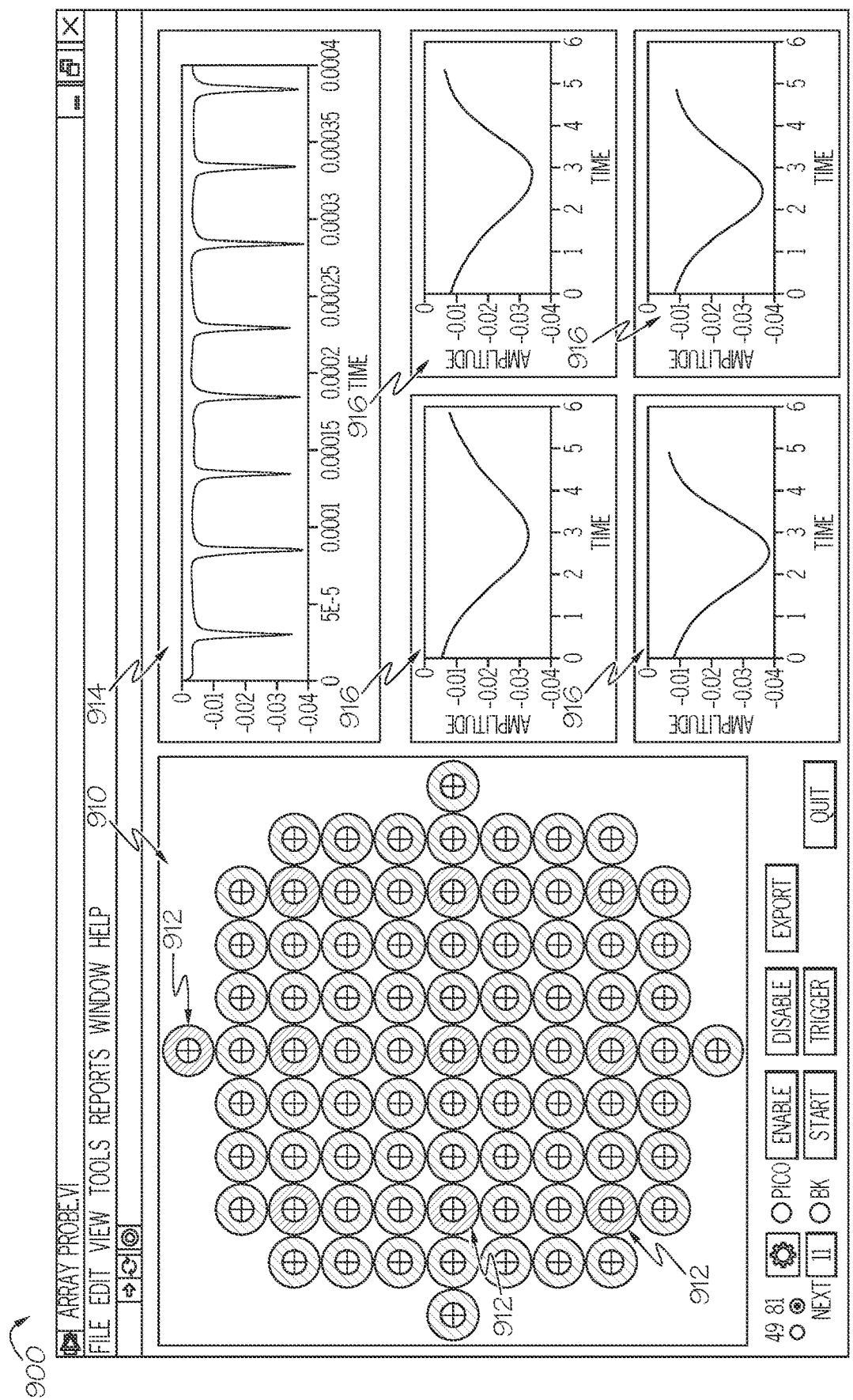
FIG. 9 depicts an illustrative screen shot of a user interface containing data pertaining to a calibration process according to one or more embodiments shown and described herein.

At block 716, a map is generated from the received electrical data and the received x-ray data at block 716. That is, the analysis component 140 generates a map that indicates one or more locations where interaction occurs between the first EB gun 101 and the second EB gun 102. Generation of the map generally includes determining a shape of the first electron beam 151 based on the electrical signals and determining a corresponding location of the second electron beam 152 (and thus the coil values corresponding thereto) at each determined shape of the first electron beam 151. Thus, when the shape of the first electron beam becomes distorted, the x-ray emissions at the same point of time are observed to determine an intensity of the emissions, which can be used to determine whether interaction is occurring. Determining the shape of the first electron beam generally includes assuming that the observed spot is Gaussian shaped and using a mathematical faltung procedure with an edge function to fit a Gaussian spot to the response. For example, FIG. 9 depicts illustrative Gaussian shapes 916 at selected sites 912 depicted in an array interface 910 of the user interface 900. The slope of the response can be used to determine the spot size when the beam speed is known. The generated map can then be used for calibrating the first EB gun 101 to avoid or reduce interaction.

Figure 8B:
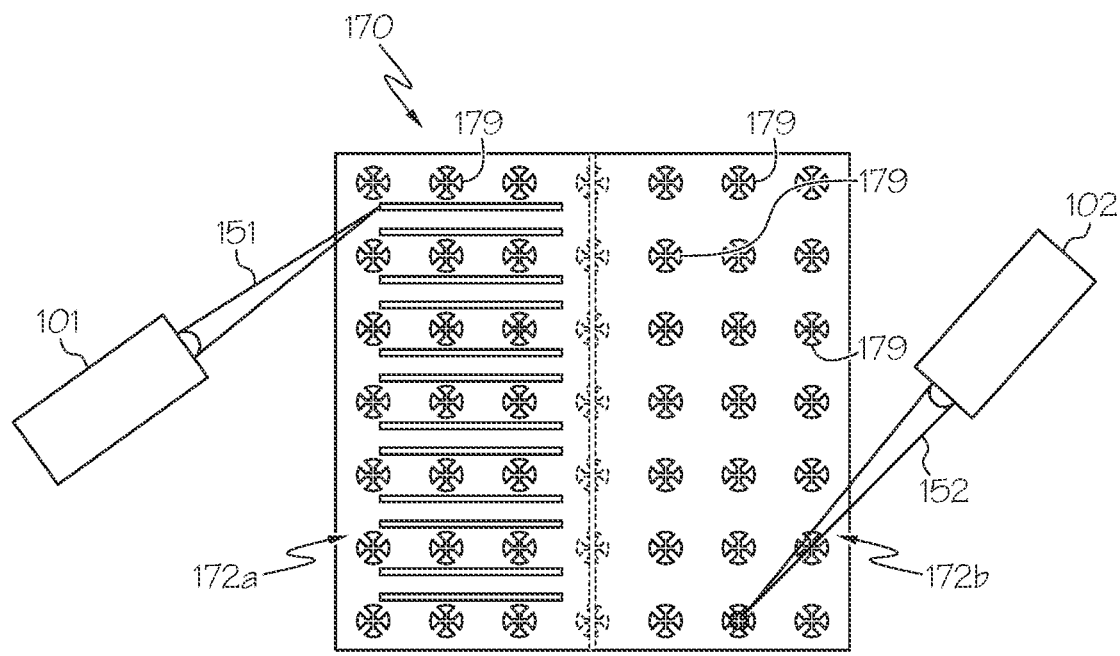
FIG. 8B schematically depicts movement of a second electron beam emitter relative to a first electron beam emitter during a calibration process according to one or more embodiments shown and described herein.

Referring to FIGS. 1A, 2B, and 7, at block 718, the analysis component 140 may also direct the second EB gun 102 to move the electron beam 152 to a calibrated position on the calibration probe 170. That is, the analysis component 140 may provide one or more signals to the power supply 260 and/or the gun control unit 262 to adjust the electrical power supplied to one or more of the coils (e.g., the at least one astigmatism coil 254, the at least one focusing coil 256, and/or the at least one deflection coil 258) such that the electron beam 152 is aimed at a particular location on the calibration probe 170. For example, as shown in FIG. 8B, the second EB gun 102 emits the beam 152 towards the second portion 172b of the calibration probe 170 as a result of the signals received from the analysis component 140. More specifically, the second EB gun 102 emits the beam 152 to one or more particular locations within one of the patterned sites 179 on the second portion 172b of the calibration probe 170 or at another location on the calibration probe 170. The location of the beam 152 impinging on the calibration probe 170 may vary based on the type of device used to detect the characteristics of the impinging beams. For example, if an x-ray signal is being detected as described herein, it may be advantageous for the second EB gun 102 to emit the beam 152 on the aluminum plate (e.g., not on one of the patterned sites 179). In some embodiments, the beam 152 may be emitted such that it impinges on a static location on one of the patterned sites 179. In other embodiments, the beam 152 may be emitted such that it moves according to a predetermined pattern over one of the patterned sites 179 such that it impinges various layers in the stack depicted in FIG. 3B (e.g., sweeps across the patterned site 179), as described herein.

Referring again to FIGS. 1A, 2A, and 7, at block 720, the analysis component 140 provides predefined coil values to the first EB gun 101 to cause the first EB gun 101 to move the electron beam 151 in a predetermined pattern according to the predefined coil values on the calibration probe 170. That is, the analysis component 140 may provide one or more signals to the power supply 210 and/or the gun control unit 212 over a period of time to adjust the electrical power supplied to one or more of the coils (e.g., the at least one astigmatism coil 204, the at least one focusing coil 206, and/or the at least one deflection coil 208) such that the electron beam 151 moves according to a particular pattern on the calibration probe 170. For example, as shown in FIG. 8B, the first EB gun 101 emits the beam 151 towards a first portion 172a of the calibration probe 170 as a result of the signals received from the analysis component 140 and continues to move the beam 151 along a pattern, as indicated by the lines located in between the various patterned sites 179 on the first portion 172a. In some embodiments, the pattern may be located such that the beam 151 does not impinge on any of the patterned sites 179 on the first portion 172a when moving according to the pattern. In other embodiments, the pattern may be located such that the beam 151 does cross over one or more of the patterned sites 179 on the first portion 172a when moving according to the pattern.

Referring again to FIGS. 1A, 7, and 8B, the analysis component 140 receives electrical data from the oscilloscope 180 that corresponds to the impingement of the second beam 152 on the second portion 172b of the calibration probe 170 at block 722. The electrical data generally includes the electrical response generated as a result of impingement of the second beam 152 on the second portion 172b of the calibration probe 170 over a measured period of time. An illustrative example of a graphical depiction of the electrical data received from the oscilloscope 180 is shown in a plot section 914 of a user interface 900 depicted in FIG. 9. As shown in the plot section 914, the voltage spikes at various intervals, the spikes corresponding to times when an event occurs. The event may be, for example, an instance where the second beam 152 moves from impinging on the dump plate 178 (FIG. 3B) to impinging on the etched foil 174 (FIG. 3B). That is, the tungsten of the etched foil 174 (FIG. 3B) causes the spike in voltage.

Referring again to FIGS. 1A and 7, the analysis component 140 receives x-ray data from the sensing device 108 that corresponds to x-ray emissions that result from impingement of the first beam 151 and the second beam 152 on the calibration probe 170 at block 724. The x-ray data generally includes times that are synchronized with the data received from the oscilloscope 180 such that an x-ray emission reading can be correlated to the spikes in voltage, as described herein.

At block 726, the map is updated to correspond to the received electrical data and the received x-ray data. That is, the analysis component 140 updates the map to indicates one or more locations where interaction occurs between the first EB gun 101 and the second EB gun 102 for the purposes of calibrating the second EB gun 102 in addition to the first EB gun 101. Updating the map generally includes determining a shape of the second electron beam 152 based on the electrical signals and determining a corresponding location of the first electron beam 151 (and thus the coil values corresponding thereto) at each determined shape of the second electron beam 152. Thus, when the shape of the first electron beam becomes distorted, the x-ray emissions at the same point of time are observed to determine an intensity of the emissions, which can be used to determine whether interaction is occurring. Determining the shape of the first electron beam generally includes assuming that the observed spot is Gaussian shaped and using a mathematical faltung procedure with an edge function to fit a Gaussian spot to the response. For example, FIG. 9 depicts illustrative Gaussian shapes 916 at selected sites 912 depicted in an array interface 910 of the user interface 900. The slope of the response can be used to determine the spot size when the beam speed is known. The generated map can then be used for calibrating the second EB gun 102 to avoid or reduce interaction.

The calibration approach can be mathematically expressed according to Equation (1) below:

$$\text{Coil}\_i\_j = F(x, y, \text{"spot size"}) \tag{1}$$

where, for each x and y position, and "spot size" F(x,y beam current, spot size), there is a set of coil signals. i refers to a specific EB gun and j refers to a specific coil on the specific EB gun. This procedure is repeated for each gun of the plurality of EB guns 101, 102. Accordingly, calibration of all of the EB guns is expressed according to Equation (2):

$$\text{Coil}\_i\_j = F(x, y, \text{"spot size"}) + \text{Sum}\_k \, \text{Sum}\_j \, F(\text{coil}\_k\_j) \tag{2}$$

F(coil_k_j) may be functions of coil signal and its derivatives. (k is the index for the gun). A mean field strategy is then employed by solving a set of Equation (2) for one gun. This results in coil_j_i. Then coil_j_i is put back to the next set of equation for gun k and so forth. The process is repeated iteratively until the signals are stabilized.

At block 728, the map and calibration calculations are provided to an external component and are used for calibrating the EB guns 101, 102. For example, the map may be provided to the database server 504 (FIG. 5) for storage and/or future retrieval. In some embodiments, the map and associated data therewith may be provided in a user-readable format. That is, a display may be directed to display the map and/or associated data in a user interface, such as the user interface 900 depicted in FIG. 9. The user interface 900 may be displayed, for example, to a user of the user computing device 502 (FIG. 5).

While FIG. 7 relates only to the calibration of two EB guns, it should be understood that the processes described in FIG. 7 can be repeated for each additional EB gun in embodiments where greater than two EB guns are included. Accordingly, the map is updated to account for each additional EB gun.

Figure 10:
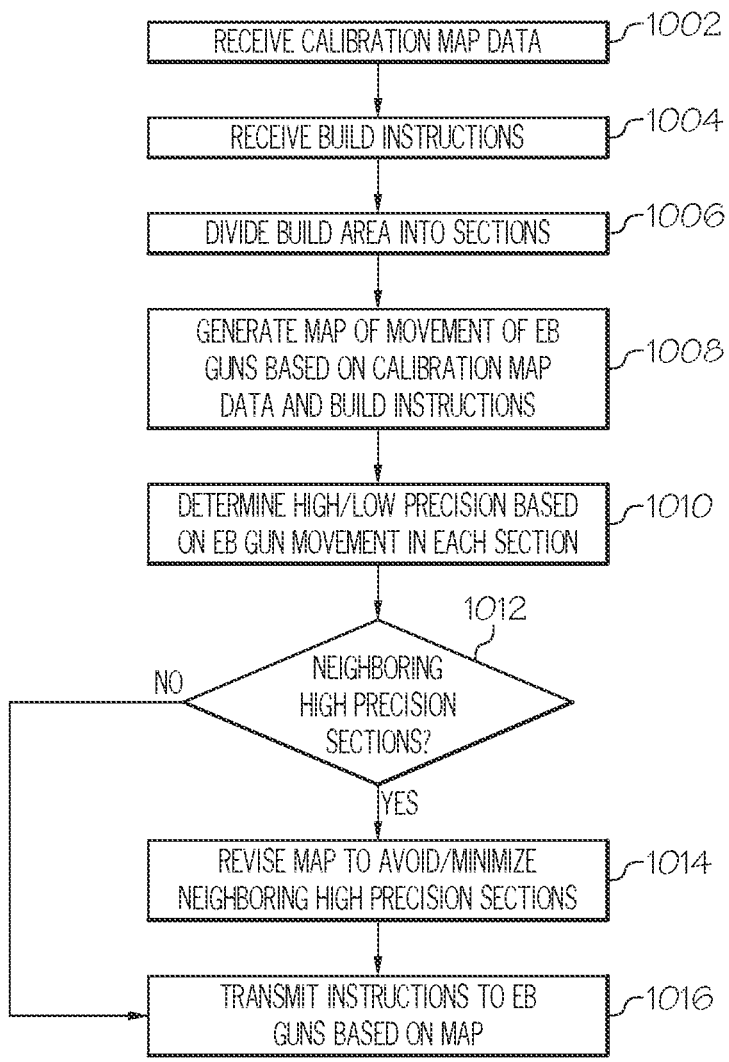
FIG. 10 depicts a flow diagram of an illustrative method of controlling a sequence of movement and/or precision of each of a plurality of electron beam emitters in an additive manufacturing system according to one or more embodiments shown and described herein.

Once the EB guns 101, 102 have been calibrated, they can be used for forming an object as described herein. In some embodiments, it may not be possible to resolve all of the interaction issues between the EB guns 101, 102. For example, even after calibration, use of a plurality of EB guns can result in interaction that cannot be overcome fully with calibration. That is, the calibration process described herein may remove some interaction, but may not be able to remove all interaction (e.g., interaction when the EB guns 101, 102 are particularly aimed with respect to one another, or interaction that cannot be accounted for in a fully correlated manner). In such embodiments, it may be advantageous to employ a melt strategy whereby one or more EB guns are operated in a low precision mode while another one or more EB guns are operated in a high precision. The EB guns running in low precision mode could be used for heating the article 116 and/or the powder layer 118 without melting, since it is necessary to maintain a high build temperature during EBM processes. FIG. 10 depicts a flow diagram of an illustrative method that may be employed to implement a melt strategy that addresses these issues.

Referring to FIGS. 1B, 5, and 10, at block 1002, the calibrated map data is received. That is, the data that is used for the purposes of calibrating the EB guns 101, 102 is retrieved from storage, such as, for example, from the database server 504. In addition to the calibrated map data, build instructions are also received at block 1004. The build instructions are generally data that is used for directing movement and/or operation of the components of the additive manufacturing system 100 to build the article 116, and may be stored in the database server 504, may be inputted by a user via the user computing device 502 and/or the electronic device 506, and/or the like.

Figure 11:
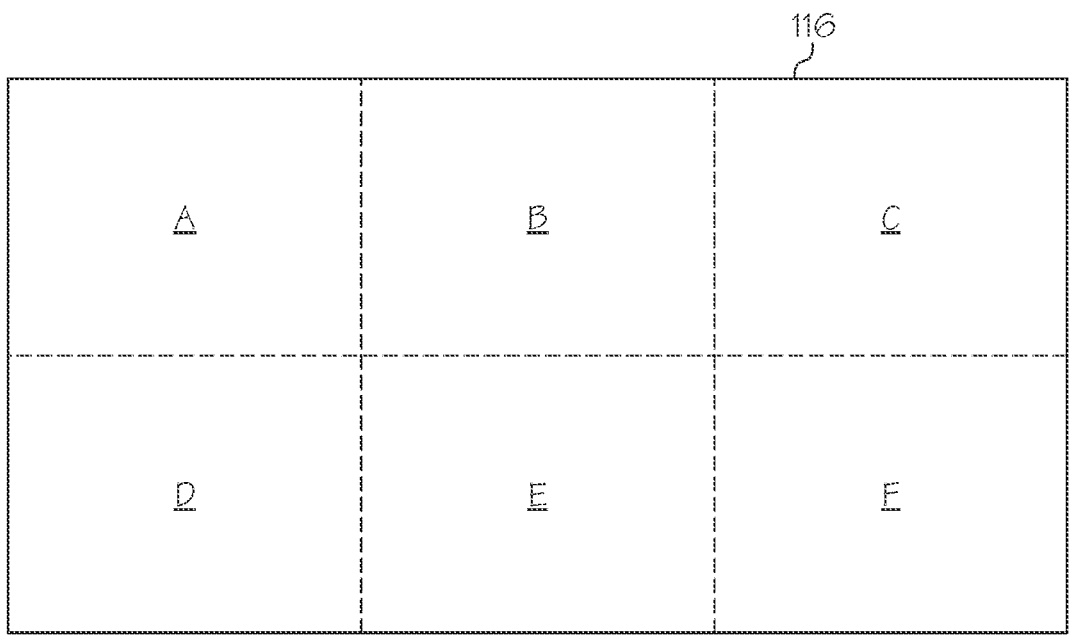
FIG. 11 schematically depicts a workpiece area divided into sections for the purposes of controlling a sequence of movement and/or precision of each of a plurality of electron beam emitters according to one or more embodiments shown and described herein.

At block 1006, the build area (e.g., the build envelope 112) may be divided into a plurality of sections, each section representing an area of the build area where, if a high precision mode is operated with one EB gun, it would be necessary to avoid using a high precision mode in adjacent areas. FIG. 11 depicts the build area (e.g., the area containing the article 116) divided into sections A, B, C, D, E, and F. While sections A, B, C, D, E, and F are depicted in FIG. 11 as being generally equal in shape and size and are in a grid configuration, the present disclosure is not limited to such. That is, the sections may be any shape, size, configuration, and/or arrangement, irrespective of the shape, size, configuration, and/or arrangement of other sections.

Referring to FIGS. 1B and 10, at block 1008, a map of planned movement of the EB guns 101, 102 may be generated based on the calibration map data and the build instructions. That is, a plan of the respective movement of the first EB gun 101 and the second EB gun 102 may be generated based on a calibration of the first EB gun 101, the second EB gun 102, movements and/or respective locations that are known to cause interaction, locations where melting is necessary for each build layer, locations where high precision melting is needed, locations where low precision melting is acceptable, and/or the like. Based on the map, a determination may be made as to where high precision and low precision melting is needed for each of the sections at block 1010. If high precision melting is needed at a particular section at a particular point in time, it may be necessary to ensure that only low precision melting occurs in the surrounding sections at the same time. For example, referring to the example depicted in FIG. 11, if high precision is needed in sections A and C at a particular point in time, then any melting that occurs in sections B, D, E, and F should avoid high precision melting and only use low precision melting to avoid interaction. Other examples are presented in Table 1 below:

| High Precision Sections | Low Precision Sections |
|---|---|
| A, C | B, D, E, F |
| D, F | A, B, C, E |
| B | A, C, D, E, F |
| E | A, B, C, D, F |

At block 1012, a determination is made as to whether neighboring high precision sections exist at a particular point in time (e.g., both sections B and C require high precision at a particular period of time). If no neighboring high precision sections exist, the process proceeds to block 1016. If neighboring high precision sections do exist, the process proceeds to block 1014.

At block 1014, the map may be revised to avoid or minimize the amount of neighboring high precision sections at a particular period in time. For example, the movement path of the EB guns 101, 102 may be revised to avoid or minimize an amount of neighboring high precision sections at one or more particular periods. At block 1016, instructions based on the map may be transmitted to the EB guns 101, 102 to cause the EB guns 101, 102 to build the article 116 based on the instructions.

It should now be understood that that the devices, systems, and methods described herein allow for use of a plurality of EB guns to form metallic articles in EBM. Using the calibration probe, the oscilloscope, and the sensing device, each one of the plurality of EB guns are particularly calibrated to avoid or minimize instances where the magnetic fields of the coils in each of the respective EB guns interact with one another. This interaction can further be avoided or minimized by coordinating the movement of the EB guns (controlling a sequence of movement and/or precision (e.g., low precision mode, high precision mode)).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

1. A calibration system for an electron beam additive manufacturing system comprising a plurality of electron beam guns, the calibration system comprising: a calibration probe positioned in a build chamber of the electron beam additive manufacturing system; a sensing device positioned to measure and acquire a response generated as a result of impingement of electron beams emitted from the plurality of electron beam guns on the calibration probe, the sensing device generating a response signal as a result of the measured and acquired response; and an analysis component communicatively coupled to the sensing device and programmed to analyze and evaluate the response signal.

2. The calibration system of any preceding clause, further comprising an oscilloscope communicatively coupled to the analysis component and electrically coupled to the calibration probe such that electrical signals generated as a result of electron beam impingement on the calibration probe are detected by the oscilloscope.

3. The calibration system of any preceding clause, wherein the analysis component comprises programming instructions that, when executed, causes the analysis component to: receive electrical data corresponding to the electrical signals detected by the oscilloscope and x-ray data corresponding to the x-ray emissions detected by the analysis component; and calibrate each of the plurality of electron beam guns based on the electrical data and the x-ray data.

4. The calibration system of any preceding clause, wherein the calibration probe comprises a top cover, an etched foil, a top base, and a dump plate arranged in a stack.

5. The calibration system of any preceding clause, wherein the top cover comprises a plurality of openings therethrough, each one of the plurality of openings exposes a portion of the etched foil, the top base, and the dump plate.

6. The calibration system of any preceding clause, wherein the etched foil comprises a plurality of patterned sites, the plurality of patterned sites corresponding to the plurality of openings in the top cover such that the plurality of patterned sites are accessible through the plurality of openings in the top cover.

7. The calibration system of any preceding clause, wherein the top cover, the top base, and the dump plate are formed from aluminum and the etched foil is formed from tungsten.

8. An electron beam additive manufacturing system, the electron beam manufacturing system comprising: a build chamber; a plurality of electron beam guns, each one of the plurality of electron beam guns emitting a corresponding electron beam within the build chamber; a calibration system that calibrates each one of the plurality of electron beam guns, the calibration system comprising: a calibration probe positioned in the build chamber; a sensing device positioned to measure and acquire a response generated as a result of impingement of electron beams emitted from the plurality of electron beam guns on the calibration probe, the sensing device generating a response signal as a result of the measured and acquired response; and an oscilloscope communicatively coupled to the analysis component and electrically coupled to the calibration probe such that electrical signals generated as a result of electron beam impingement on the calibration probe are detected by the oscilloscope; and an analysis component communicatively coupled to the oscilloscope and the sensing device.

9. The electron beam additive manufacturing system of any preceding clause, wherein the analysis component comprises programming instructions that, when executed, cause the analysis component to: receive electrical data corresponding to the electrical signals detected by the oscilloscope and x-ray data corresponding to the x-ray emissions detected by the analysis component; and calibrate each of the plurality of electron beam guns based on the electrical data and the x-ray data.

10. The electron beam additive manufacturing system of any preceding clause, wherein the build chamber comprises a build envelope having a movable build platform, the movable build platform supporting the calibration probe thereon.

11. The electron beam additive manufacturing system of any preceding clause, wherein the calibration probe is removable from the movable build platform such that one or more powder layers can be deposited on the movable build platform during an additive manufacturing process.

12. The electron beam additive manufacturing system of any preceding clause, further comprising a powder distributor communicatively coupled to the analysis component, wherein the calibration probe is vertically aligned with the powder distributor.

13. The electron beam additive manufacturing system of any preceding clause, wherein the calibration probe comprises a top cover, an etched foil, a top base, and a dump plate arranged in a stack.

14. The electron beam additive manufacturing system of any preceding clause, wherein the top cover comprises a plurality of openings therethrough, each one of the plurality of openings exposes a portion of the etched foil, the top base, and the dump plate.

15. The electron beam additive manufacturing system of any preceding clause, wherein the etched foil comprises a plurality of patterned sites, the plurality of patterned sites corresponding to the plurality of openings in the top cover such that the plurality of patterned sites are accessible through the plurality of openings in the top cover.

16. The electron beam additive manufacturing system of any preceding clause, wherein the top cover, the top base, and the dump plate are formed from aluminum and the etched foil is formed from tungsten.

17. The electron beam additive manufacturing system of any preceding clause, wherein each one of the plurality of electron beam guns comprises one or more focusing coils and one or more deflection coils, each of the one or more focusing coils and the one or more deflection coils receiving a modifiable electrical current that adjusts an electromagnetic field within the coil, the electromagnetic field altering one or more properties of the electron beam.

18. The electron beam additive manufacturing system of any preceding clause, wherein each of the electron beam guns further comprises at least one gun control unit that is communicatively coupled to the analysis component and modifies the electrical current according to one or more calibration signals received from the analysis component.

19. A method of calibrating a plurality of electron beam guns in a build chamber, the method comprising: directing a first electron beam gun of the plurality of electron beam guns to execute a first scan function, the first scan function causing a first electron beam emitted from the first electron beam gun to impinge on a plurality of portions of a first patterned site located on a first portion of a calibration probe in the build chamber; providing one or more predetermined coil values to a second electron beam gun of the plurality of electron beam guns, the predetermined coil values, when executed, causing the second electron beam gun to emit a second electron beam that impinges along a predetermined path on a second portion of the calibration probe; receiving one or more first signals from the calibration probe, the one or more first signals indicative of a response generated as a result of impingement the first electron beam on the plurality of portions of the first patterned site; and synchronizing in time the one or more first signals with coil values of the first electron beam gun and the predetermined coil values of the second electron beam gun.

20. The method of any preceding clause, wherein the predetermined coil values are constant in time.

What is claimed is:

1. A calibration system for an electron beam additive manufacturing system, the calibration system comprising:
a calibration probe positioned in a build chamber of the electron beam additive manufacturing system;
a plurality of electron beam guns, each one of the plurality of electron beam guns configured to emit an electron beam that impinges on the calibration probe;
a sensing device positioned to measure and acquire a response generated as a result of impingement of each electron beam emitted from the plurality of electron beam guns on the calibration probe, the sensing device generating a response signal as a result of the measured and acquired response; and an analysis component communicatively coupled to the sensing device and programmed to analyze the response signal, evaluate the response signal, and synchronize a timing of the plurality of electron beam guns with respect to each other to avoid or minimize interaction between electron beams emitted therefrom, wherein each electron beam gun of the plurality of electron beam guns comprises:
an electron emitter;
at least one focusing coil; and
at least one deflection coil.

2. The calibration system of claim 1, further comprising an oscilloscope communicatively coupled to the analysis component and electrically coupled to the calibration probe such that electrical signals generated as a result of electron beam impingement on the calibration probe are detected by the oscilloscope.

3. The calibration system of claim 2, wherein the analysis component comprises programming instructions that, when executed, causes the analysis component to:
receive electrical data corresponding to the electrical signals detected by the oscilloscope and x-ray data corresponding to x-ray emissions detected by the sensing device; and
calibrate each of the plurality of electron beam guns based on the electrical data and the x-ray data.

4. The calibration system of claim 1, wherein the calibration probe comprises a top cover, an etched foil, a top base, and a dump plate arranged in a stack.

5. The calibration system of claim 4, wherein the top cover comprises a plurality of openings therethrough, each one of the plurality of openings exposes a portion of the etched foil, the top base, and the dump plate.

6. The calibration system of claim 5, wherein the etched foil comprises a plurality of patterned sites, the plurality of patterned sites corresponding to the plurality of openings in the top cover such that the plurality of patterned sites are accessible through the plurality of openings in the top cover.

7. The calibration system of claim 4, wherein the top cover, the top base, and the dump plate are formed from aluminum and the etched foil is formed from tungsten.

8. An electron beam additive manufacturing system, the electron beam additive manufacturing system comprising:
a build chamber;
a plurality of electron beam guns, each one of the plurality of electron beam guns emitting a corresponding electron beam within the build chamber and comprising:
an electron emitter;
at least one focusing coil;
at least one deflection coil; and
a calibration system that calibrates each one of the plurality of electron beam guns with respect to one another, the calibration system comprising:
a calibration probe positioned in the build chamber;
a sensing device positioned to measure and acquire a response generated as a result of impingement of electron beams emitted from the plurality of electron beam guns on the calibration probe, the sensing device generating a response signal as a result of the measured and acquired response; and
an oscilloscope electrically coupled to the calibration probe such that electrical signals generated as a result of electron beam impingement on the calibration probe are detected by the oscilloscope; and
an analysis component communicatively coupled to the oscilloscope and the sensing device.

9. The electron beam additive manufacturing system of claim 8, wherein the analysis component comprises programming instructions that, when executed, cause the analysis component to:
receive electrical data corresponding to the electrical signals detected by the oscilloscope and x-ray data corresponding to x-ray emissions detected by the sensing device; and
calibrate each of the plurality of electron beam guns based on the electrical data and the x-ray data.

10. The electron beam additive manufacturing system of claim 8, wherein the build chamber comprises a build envelope having a movable build platform, the movable build platform supporting the calibration probe thereon.

11. The electron beam additive manufacturing system of claim 10, wherein the calibration probe is removable from the movable build platform such that one or more powder layers can be deposited on the movable build platform during an additive manufacturing process.

12. The electron beam additive manufacturing system of claim 8, further comprising a powder distributor communicatively coupled to the analysis component, wherein the calibration probe is vertically aligned with the powder distributor.

13. The electron beam additive manufacturing system of claim 8, wherein the calibration probe comprises a top cover, an etched foil, a top base, and a dump plate arranged in a stack.

14. The electron beam additive manufacturing system of claim 13, wherein the top cover comprises a plurality of openings therethrough, each one of the plurality of openings exposes a portion of the etched foil, the top base, and the dump plate.

15. The electron beam additive manufacturing system of claim 14, wherein the etched foil comprises a plurality of patterned sites, the plurality of patterned sites corresponding to the plurality of openings in the top cover such that the plurality of patterned sites are accessible through the plurality of openings in the top cover.

16. The electron beam additive manufacturing system of claim 13, wherein the top cover, the top base, and the dump plate are formed from aluminum and the etched foil is formed from tungsten.

17. The electron beam additive manufacturing system of claim 8, wherein each one of the plurality of electron beam guns comprises one or more focusing coils and one or more deflection coils, each of the one or more focusing coils and the one or more deflection coils receiving a modifiable electrical current that adjusts an electromagnetic field within the one or more deflection coils, the electromagnetic field altering one or more properties of the electron beam.

18. The electron beam additive manufacturing system of claim 17, wherein each one of the plurality of electron beam guns further comprises at least one gun control unit that is communicatively coupled to the analysis component and modifies the modifiable electrical current according to one or more calibration signals received from the analysis component.

19. A method of calibrating a plurality of electron beam guns in a build chamber, the method comprising:
directing a first electron beam gun of the plurality of electron beam guns to execute a first scan function, the first scan function causing a first electron beam emitted from the first electron beam gun to impinge on a plurality of portions of a first patterned site located on a first portion of a calibration probe in the build chamber;

providing one or more predetermined coil values to a second electron beam gun of the plurality of electron beam guns, the predetermined coil values, when executed, causing the second electron beam gun to emit a second electron beam that impinges along a predetermined path on a second portion of the calibration probe;

receiving one or more first signals from the calibration probe, the one or more first signals indicative of a response generated as a result of impingement the first electron beam on the plurality of portions of the first patterned site; and synchronizing a timing of the one or more first signals with coil values of the first electron beam gun and the predetermined coil values of the second electron beam gun, wherein each electron beam gun of the plurality of electron beam guns comprises:
   an electron emitter;
   at least one focusing coil; and
   at least one deflection coil.

20. The method of claim 19, wherein the predetermined coil values are constant in time.

* * * * *